United States Patent
Sung et al.

(10) Patent No.: US 10,805,219 B2
(45) Date of Patent: Oct. 13, 2020

(54) METHODS AND SYSTEMS FOR EVALUATING NETWORK PERFORMANCE OF AN AGGREGATED CONNECTION

(71) Applicant: Pismo Labs Technology Limited, Kowloon (HK)

(72) Inventors: Patrick Ho Wai Sung, Kowloon (HK); Wan Chun Leung, New Territories (HK); Alex Wing Hong Chan, Tai Tam (HK); Kam Chiu Ng, New Territories (HK)

(73) Assignee: PISMO LABS TECHNOLOGY LIMITED, Kowloon (HK)

( * ) Notice: Subject to any disclaimer, the term of this patent is extended or adjusted under 35 U.S.C. 154(b) by 31 days.

(21) Appl. No.: 16/322,080

(22) PCT Filed: Sep. 12, 2017

(86) PCT No.: PCT/IB2017/055479
§ 371 (c)(1),
(2) Date: Jan. 30, 2019

(87) PCT Pub. No.: WO2018/172833
PCT Pub. Date: Sep. 27, 2018

(65) Prior Publication Data
US 2019/0190834 A1 Jun. 20, 2019

Related U.S. Application Data

(63) Continuation-in-part of application No. 15/462,951, filed on Mar. 20, 2017, now Pat. No. 9,876,723, (Continued)

(51) Int. Cl.
*H04L 12/803* (2013.01)
*H04W 24/08* (2009.01)
(Continued)

(52) U.S. Cl.
CPC ............ *H04L 47/125* (2013.01); *H04L 43/08* (2013.01); *H04L 43/0858* (2013.01);
(Continued)

(58) Field of Classification Search
CPC ..... H04L 43/08; H04L 43/0858; H04L 43/16; H04L 47/125; H04L 47/18; H04L 47/2416; H04L 47/2441; H04W 24/08
(Continued)

(56) References Cited

U.S. PATENT DOCUMENTS

2002/0018447 A1    2/2002   Yamada
2003/0048750 A1    3/2003   Kobayashi
(Continued)

FOREIGN PATENT DOCUMENTS

CA      2808078 A1   10/2010
CN     101656637 A    2/2010
(Continued)

OTHER PUBLICATIONS

International Search Report of International Application No. PCT/IB2017/055479, dated Dec. 28, 2017.
(Continued)

*Primary Examiner* — Mark H Rinehart
*Assistant Examiner* — Kokou R Detse
(74) *Attorney, Agent, or Firm* — Hershkovitz & Associates, PLLC; Abe Hershkovitz

(57) ABSTRACT

Methods and systems for transmitting data packets through a selected connection that the first data packet of a data session satisfies a match condition. The match condition is received through a user interface. When data packets of the
(Continued)

data session are received, the data packets will then be transmitted through a selected connection. The selected connection is selected from connections based on a connection selection criteria. Further differentiated services code point (DSCP) of first data packet is changed when sent by a computing device. After a network node receives the first data packet, then resets the DSCP value before sending the first data packet.

20 Claims, 18 Drawing Sheets

Related U.S. Application Data which is a continuation of application No. 14/410,099, filed as application No. PCT/IB2014/063084 on Jul. 14, 2014, now Pat. No. 9,602,412.

(51) Int. Cl.
*H04L 12/853* (2013.01)
*H04L 12/26* (2006.01)
*H04L 12/801* (2013.01)
*H04L 12/851* (2013.01)

(52) U.S. Cl.
CPC .............. *H04L 43/16* (2013.01); *H04L 47/18* (2013.01); *H04L 47/2416* (2013.01); *H04L 47/2441* (2013.01); *H04W 24/08* (2013.01)

(58) Field of Classification Search
USPC ........................................................ 370/236
See application file for complete search history.

(56) References Cited

U.S. PATENT DOCUMENTS

| | | |
|---|---|---|
| 2008/0117834 A1 | 5/2008 | Ohno |
| 2011/0096849 A1 | 4/2011 | Kubsch |
| 2013/0111038 A1 | 5/2013 | Girard |
| 2013/0201836 A1 | 8/2013 | Cook |
| 2014/0040442 A1 | 2/2014 | Humberto |
| 2014/0226663 A1* | 8/2014 | Chan ...................... H04L 47/34 370/392 |
| 2015/0312112 A1 | 10/2015 | Sung et al. |
| 2016/0261504 A1* | 9/2016 | Sung ...................... H04L 47/18 |
| 2016/0330660 A1* | 11/2016 | Wong ................ H04W 36/0058 |
| 2017/0195233 A1 | 7/2017 | Sung et al. |

FOREIGN PATENT DOCUMENTS

| | | |
|---|---|---|
| CN | 201616064 U | 10/2010 |
| CN | 105579989 A | 5/2016 |

OTHER PUBLICATIONS

Written Opinion of the International Searching Authority of International Application No. PCT/IB2017/055479, dated Dec. 28, 2017.
Non Final Office Action of U.S. Appl. No. 15/462,951, dated May 5, 2017.
Non Final Office Action of U.S. Appl. No. 14/410,099, dated Jul. 21, 2017.
International Search Report of International Application No. PCT/IB2014/063084, dated Apr. 20, 2015.
Written Opinion of the International Searching Authority of International Application No. PCT/IB2014/063084, dated Apr. 20, 2015.

* cited by examiner

METHODS AND SYSTEMS FOR EVALUATING NETWORK PERFORMANCE OF AN AGGREGATED CONNECTION

TECHNICAL FIELD

The present invention relates in general to the field of computer networks. More particularly, the present invention relates to methods and systems for determining performance of a plurality of connections periodically by transmitting evaluation packets through the plurality of connections. One or more connections are selected for transmitting data packets, based on, at least in part, the performance. Data packets are transmitted through at least one of the one or more connections.

BACKGROUND ART

A multi Wide Area Network (WAN) communications device is able to transmit data packets using one or more of its WAN interfaces. The communications device also supports aggregating the bandwidth of multiple WAN interfaces. The communications device also supports end-to-end connections, such as virtual private network (VPN) connection and session based site-to-site (VPN) connection and tunneling. In some implementations, each TCP/IP session is routed to only one WAN. In this configuration, a single TCP file transfer session may only utilize the bandwidth of one WAN connection on each end. For example, in a session based site-to-site virtual private network (VPN) connection, VPN traffic is routed to multiple WAN connections between two sites (e.g., sites A and B).

In one implementation, M×N tunnels are initially formed between the WAN connections where M and N are the number of WAN network connections of site A and site B, respectively. Application TCP/IP sessions are then routed over the different tunnels. It is notable, however, that while a session based site-to-site VPN is able to utilize different tunnels for different sessions, a single download session in this type of connection is only able to utilize one tunnel.

When a communications device transmits data packets, the communications device needs to select the most suitable WAN network interface, access connection, logical connection or end-to-end connection to transmit data packets. However, it takes time to identify which of the WAN network interfaces, access connection, logical connections or end-to-end connections is the most suitable. The most suitable WAN network interface, access connection, logical connection or end-to-end connection to transmit data packets should be the one that may transmit data packets the quickest or according to a set of performance criteria. Furthermore, when a communications device establishes a plurality of end-to-end connections belonging to an aggregated end-to-end connection, it is important to choose the end-to-end connections with best performance to transmit data packets, so that the overall performance of the aggregate end-to-end connection is satisfactory, and is not affected negatively by transmitting data packets through established end-to-end connections that have poor performance.

However, it is well known that performance of end-to-end connections may vary from time to time. Therefore, it is desirable that the performance of the end-to-end connections is re-determined periodically in order to check which end-to-end connection(s) have the best performance at a given time. It is also important that the performance of the established end-to-end connections is re-determined using data packets containing same information so that a fair comparison may be made between the established end-to-end connections based on their performances.

DISCLOSURE OF INVENTION

Summary of Invention

The present invention discloses a method carried out by a first communications device for determining performance of a plurality of connections and selecting at least one first connection from the plurality of connections substantially based on performance. Data packets are then transmitted through the at least one first connection. The plurality of connections may be aggregated to form an aggregated connection. The determining of performance is performed by transmitting evaluation packets through the plurality of connections. The evaluation packets are based on data packets that are received by the first communication device but have not yet been transmitted through the aggregated connection. The data packets may be designated for a host or node reachable through the aggregated connection. Alternatively, the evaluation packets may be based on predefined information when there are no data packets to be transmitted through the aggregated connection. The determining of performance may be performed periodically. Data packets may be transmitted using load balancing when there is more than one first connection.

According to one of the embodiments of the present invention, each connection of the at least one first connection is classified into at least two groups. At least one of the at least two groups is preferred for transmitting a first type of data packets, whereas another at least one of the at least two groups is preferred for transmitting a second type of data packets.

According to one of the embodiments of the present invention, the evaluation packets have the same or substantially the same size. The evaluation packets may also have the same or substantially the same information.

According to one of the embodiments of the present invention, the performance is substantially based on latency. The at least one first connection is further based on corresponding latency requirement of the data packets. The corresponding latency requirement of the data packets may be determined according to the contents of the data packets. In one variant, when the latency of a connection is determined to be higher than about 1000 milliseconds, the connection is not selected as one of the at least one first connection. When the latency of a second connection is more than about 800 milliseconds, the second connection is not used for data packets containing near real time video data or near real-time voice communication. When the latency of a third connection is more than about 500 milliseconds, the third connection is not used for near real-time voice communication. The second connection and the third connection are comprised in the at least one first connection.

The present invention further discloses a method for transmitting data packets at a first communications device through an aggregated connection by first determining latency of a plurality of connections comprised in the aggregated connection. The difference in latency of the plurality of connections is determined and it is determined whether the difference in latency is higher than a latency discrepancy threshold. If the difference in latency is higher than the latency discrepancy threshold, at least one first connection with highest latency is not used for transmitting data packets. At least one second connection with comparatively low latency is used to transmit data packets instead.

The plurality of connections is consisted of the at least one first connection and/or the at least one second connection. In one variant, the at least one first connection is established using third generation of mobile telecommunications technology (3G), and the at least one second connection is established using fourth generation of mobile telecommunications technology (4G) or wired Ethernet. In one variant, when the aggregated connection only comprises at least one first connection established using 3G, the at least one first connection is used for transmitting data packets.

DETAILED DESCRIPTION

Figure 1A:
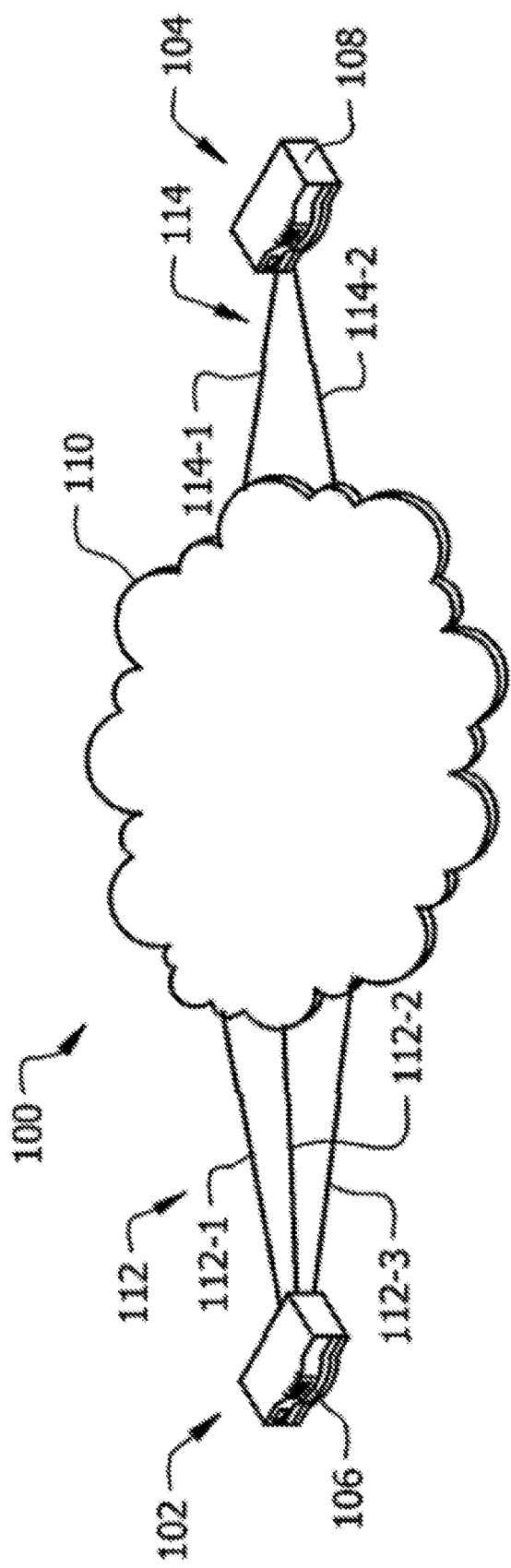
FIG. 1A illustrates a network environment according to various embodiments of the present invention.

FIG. 1A illustrates system 101 showing a network environment according to one of the embodiments of the present invention. System 101 includes multiple sites 102 and 104, which each comprise at least one communications device 106 and 108. Communications devices 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and communications device 106 may comprise M connections 112, and site 104 and communications device 108 may comprise N connections 114. Connections 112 and 114 are access connections for communicating information within network 110 between sites 102 and 104. In the illustrated embodiment, M is equal to 3 and N is equal to 2; however, these values may vary according to desired devices and configurations. Connections 112 and 114 may have similar or differing bandwidth capabilities. Further, connections 112 and 114 may comprise different types of WAN connections, such as a WiFi, cable, DSL, T1, 3G, 4G, LTE, satellite connections, and the like. It is also noted that site 102 and site 104 may be thought of as both a sender or receiver, and discussions regarding the functionality of either site may be implemented on the other site. In other words, system 100 may be implemented as a symmetrical network.

Figure 1B:
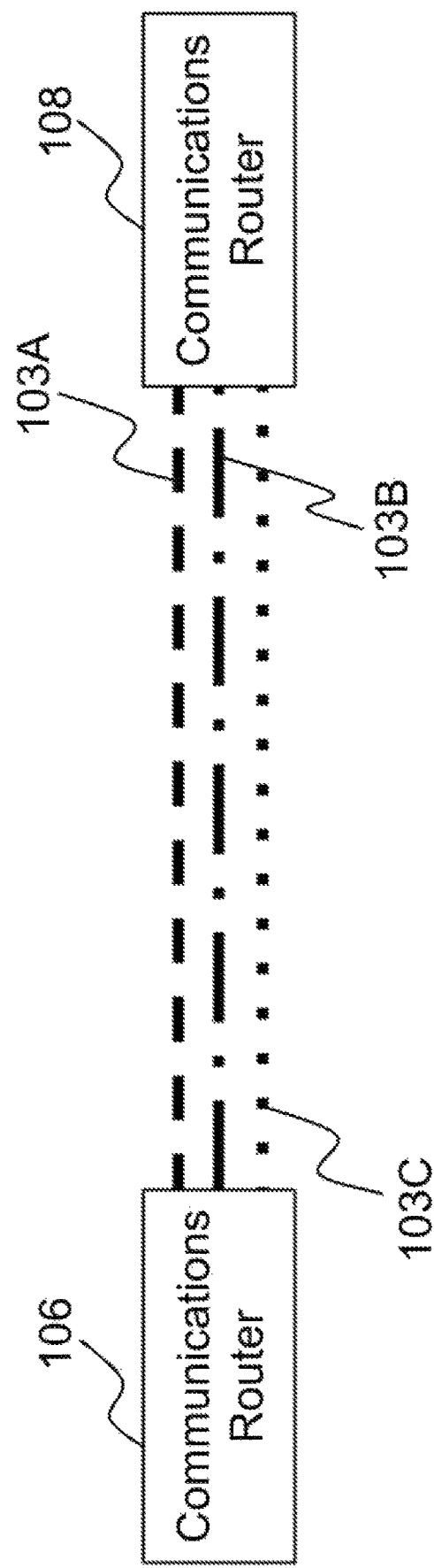
FIG. 1B illustrates a network environment according to one of the embodiments of the present invention.

FIG. 1B illustrates a network environment according to one of the embodiments of the present invention. Logical connections 103A, 103B and 103C connect communications device 106 to communications device 108. In one variant, logical connections 103A, 103B and 103C are end-to-end connections that are bonded to form an aggregated end-to-end connection. In one variant, logical connections 103A, 103B and 103C are classified into different groups of connections and data is transmitted through the connections based, at least in part, on the groups the connections are classified into.

Communications devices 106 and 108 have a plurality of network interfaces according to one of the embodiments. Communications device 106 establishes logical connections 103A, 103B, and 103C via one or more of its plurality of network interfaces with one or more network interfaces of communications device 108.

Communication device 106 and 108 may work as a gateway, a router, a switch, an access point, a hub, a bridge, etc.

Figure 1C:
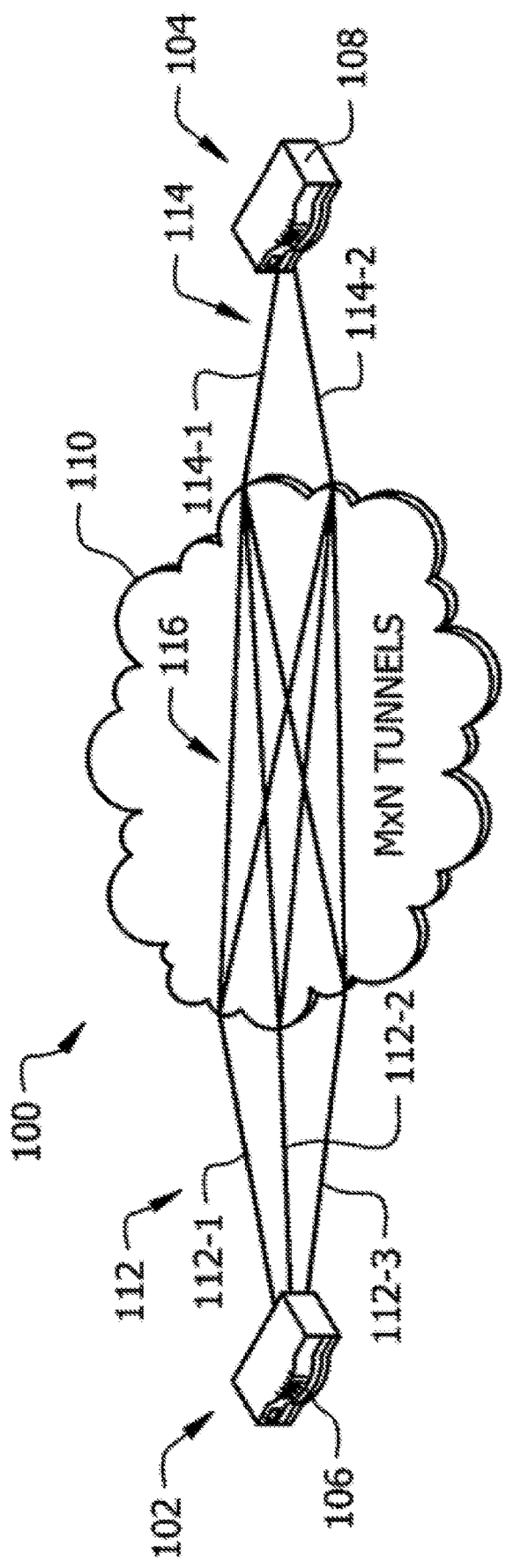
FIG. 1C illustrates a network environment according to one of the embodiments of the present invention.

FIG. 1C illustrates system 100 adapted according to embodiments configured to optimize the throughput of bonded multiple variable bandwidth connections by adjusting a tunnel bandwidth weighting schema during a data session. System 100 is similar to system 101, with the exception of M×N virtual tunnels 116. When establishing a bonded connection between sites 102 and 104, such as by implementing a bonded site-to-site VPN connection, M×N virtual tunnels 116 may be created. Virtual tunnels 116 correspond to a unique permutation of the network connections of site 102 and the network connections of site 104. An aggregated end-to-end connection is formed between communications devices 106 and 108. Connections 112 and 114 are embodied as logical connections.

Figure 2:
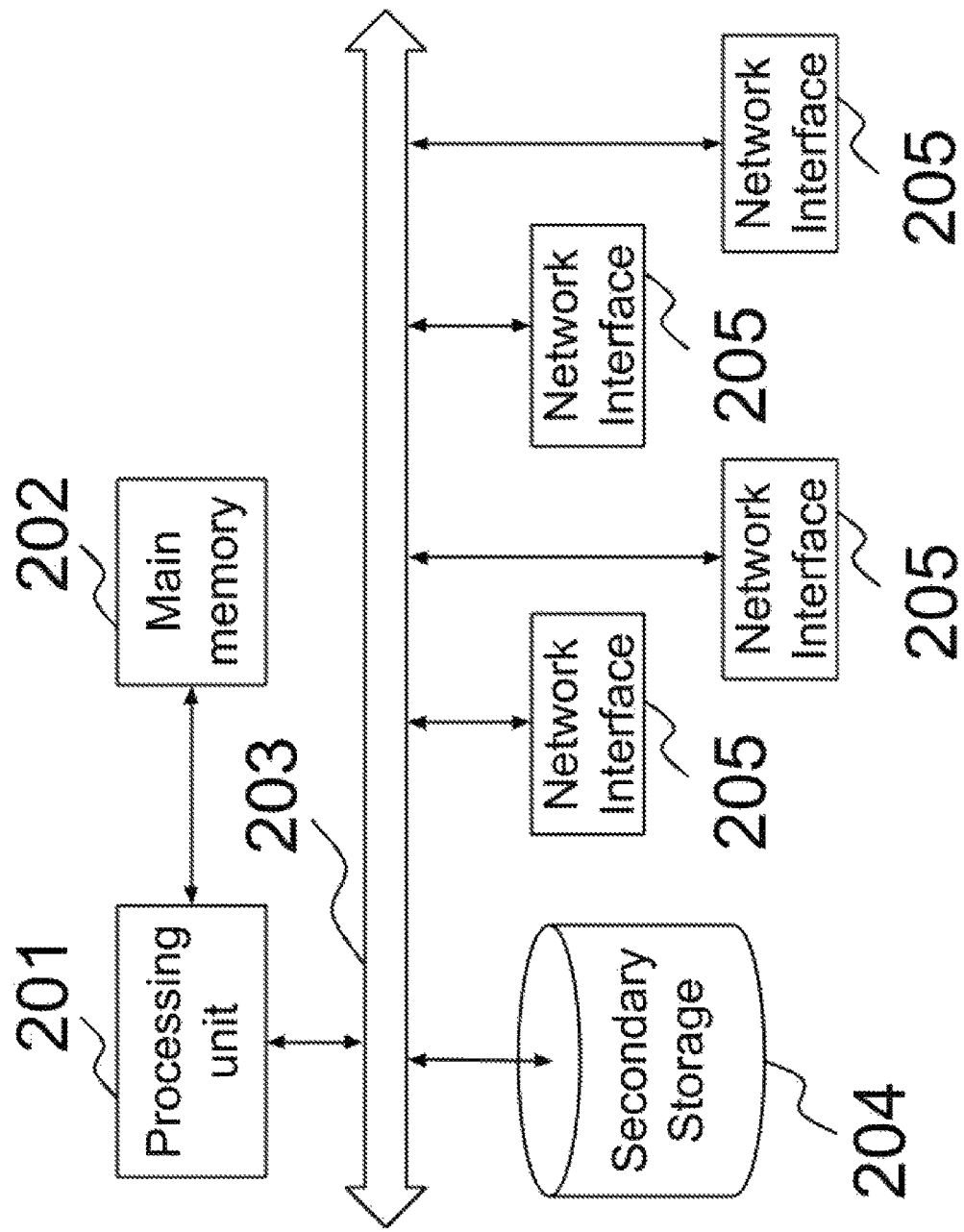
FIG. 2 is an illustrative block diagram of a communication device according to one of the embodiments of the present invention.

FIG. 2 is an illustrative block diagram of a communications device, such as communications device 106, according to one of the embodiments of the present invention. Communications device 106 comprises processing unit 201, main memory 202, system bus 203, secondary storage 204, and plurality of network interfaces 205. Processing unit 201 and main memory 202 are connected to each other directly. System bus 203 connects processing unit 201 directly or indirectly to secondary storage 204, and plurality of network interfaces 205. Using system bus 203 allows communications device 106 to have increased modularity. System bus 203 couples processing unit 201 to secondary storage 204, and plurality of network interfaces 205. System bus 203 can be any of several types of bus structures including a memory bus, a peripheral bus, and a local bus using any of a variety of bus architectures. Secondary storage 204 stores program instructions for execution by processing unit 201. Secondary storage 204 further stores conditions, wherein classification of connections into different groups depends on whether or not the connections satisfy the conditions. Secondary storage 204 also stores predefined time periods for transmitting data packets for determining performance of connections and data packets belonging to a data session respectively.

One or more network interfaces 205 are connected to corresponding access connections. Communications device 106 uses one or more access connections to connect to one or more public networks and/or private networks as illustrated in FIG. 1A. In one variant, one or more connections may be established using an access connection to connect communications device 106 with another network node, such as communications device 108, or network host, as illustrated in FIG. 1B and FIG. 1C.

Figure 3A:
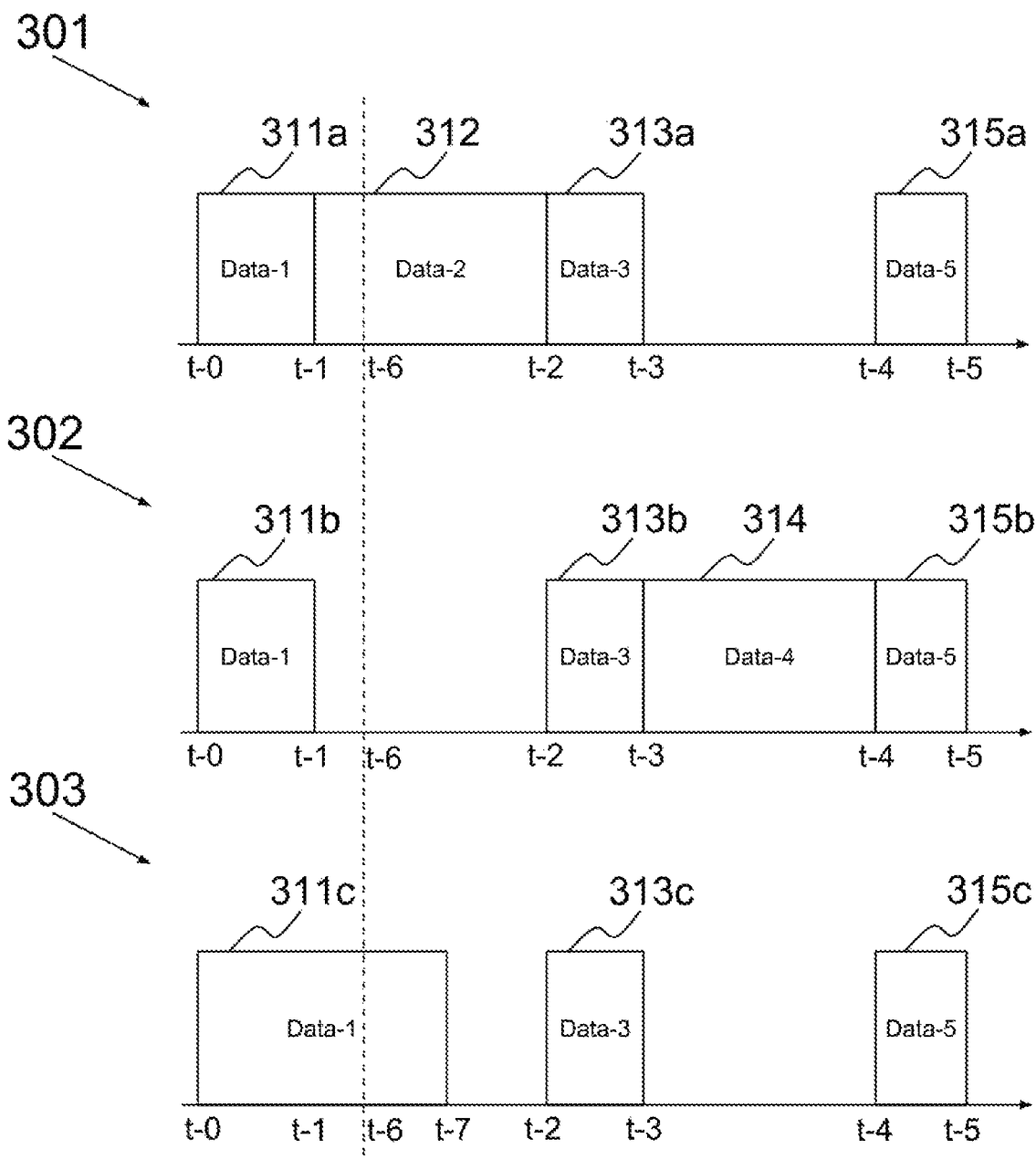
FIG. 3A illustrates timing graphs according to one of the embodiments of the present invention.

FIG. 3A illustrates timing graphs representing the transmission of evaluation packets and data packets through connections at a communications device, such as communications device 106 according to one of the embodiments. FIG. 3A is viewed in conjunction with FIG. 2 for better understanding. Timing graphs 301, 302 and 303 represent transmission through a first, second and third connection respectively. The horizontal axis represents time. Communications device 106 connects to the first, second and third connections through at least one of the plurality of network interfaces 205. Time instances are represented by t-0, t-1, t-6, t-7, t-2, t-3, t-4 and t-5.

For illustration purpose, evaluation packets 311a, 311b and 311c are transmitted through the first, second and third connections at t-0 or substantially the same time respectively in order to determine performance of the first, second and third connections. At about t-1, communications device 106 has already transmitted evaluation packets 311a and 311b through the first connection and the second connection respectively, and has received the acknowledgement from communications device 108. However, communications device 106 has not completed the transmitting of evaluation packet 311c. The difference in the amount of time required to transmit evaluation packets may be due to myriad reasons, including network performance of a connection. Also, at about t-1, processing unit 201 has determined the first connection has the best network performance after it has completely transmitted evaluation packet 311a. It is well known to those skilled in the arts that there are myriad ways to determine network performance based on evaluation packets. For clarification, the present invention is not restricted to have processing unit 201 to make the network performance decision at about the same time after completely transmitting evaluation packet 311a. Performance may be determined based on transmission of the evaluation packets and the receipt of the acknowledgement. Performance may further be determined based on receipt of data packets from communications device 108.

Once processing unit 201 has determined that the first connection has the best performance, processing unit 201 selects the first connection to transmit data packets 312. Data packets 312 contain data represented by data-2. Data-2 may belong to one data stream, a plurality of data streams or data belonging to no stream. The length of data-2 may vary. Data packets 312 may have different sizes and may comprise one or more data packets. For example, data packets 312 may be Internet Protocol (IP) packets.

In another illustration, at about t-2, processing unit 201 re-starts the process to determine performance of the first second and third connections again. At about t-3, processing unit 201 has determined that the second connection has the best performance and as a result selecting the second connection to transmit data packets 314.

In one variant, evaluation packets 311, 313 and 315 are transmitted in order to select a network interface for transmitting data packets. For example, the plurality of network interfaces 206 comprises a first, second and third network interface. Evaluation packets are transmitted through the first, second and third network interfaces for determining which network interface is associated with a connection with the best performance. For illustration purpose, when the first network interface is determined to be associated with the connection with the best performance, data packets are transmitted through the connection(s) associated with the first network interface. The connections may be access connections or logical connections.

According to one of the embodiments of the present invention, evaluation packets that are transmitted at about the same time contain the same or substantially the same information. For example, evaluation packets 311a, 311b and 311c contain the same or substantially the same information data-1. Similarly, evaluation packets 313a, 313b and 313c contain the same or substantially the same information data-3. Similarly, evaluation packets 315a, 315b and 315c contain the same or substantially the same information data-5. Evaluation packets 311, 313 and 315 are all transmitted in order to determine performance of the connections.

When using the same or substantially the same information, processing unit 201 does not need to generate different information for the evaluation packets. This may reduce the amount of computing resources required. In addition, the performance of the connections can be compared more accurately as the length and contents of the evaluation packets are the same or substantially the same.

In one variant, the same or substantially the same information belongs to the same data session. For illustration purpose, data-1 contained in evaluation packets 311a, 311b and 311c, data-2 contained in data packets 312, data-3 contained in evaluation packets 313a, 313b and 313c, data-4 contained in data packets 314 and data-5 contained in evaluation packets 315a, 315b and 315c belong to the same data session. Therefore, the evaluation packets are data packets belonging to the data session. The benefit of using evaluation packets belonging to a data session to determine the performance is that the flow of data transmission is not disrupted, interrupted, or paused significantly when evaluation packets are transmitted. This is important because performance could be evaluated or determined periodically and frequently, and not just at the beginning of the data session. When there is a current data session, and there are data packets to be transmitted, it is preferred to use the data packets as evaluation packets, i.e. evaluate performance of connections based on the transmission of data packets.

In another illustration, a video stream is being transmitted through communications device 106 to communications device 108 using TCP. Data-1 of evaluation packets 311a, 311b and 311c encapsulates data of a first frame of the video. Data-2 of data packets 312 encapsulates data of a second frame of the video. Data-3 of evaluation packets 313a, 313b and 313c are a third frame of the video. Data-4 of data packet 314 encapsulates data of a fourth frame of the video. Data-5 of evaluation packets 315a, 315b and 315c encapsulates data of a fifth frame of the video. When performance is being determined through the evaluation packets, data of the video stream is still being transmitted. In addition, the video is still being transmitted from communications device 106 to communications device 108 without interruption even when different connections are selected from t-0 to t-5, i.e. when the first connections is selected at about t-1 and the second connection is selected at about t-3.

Another benefit of using evaluation packets belonging to a data session is that real time data is used to determine performance. This makes the performance determination more accurate and relevant.

In one variant, evaluation packets 311, 313 and 315 contain information that is predefined. Although using evaluation packets containing predefined information to determine the performance during a data session may disrupt the flow of data session, the performance determined may be used to compare against historical performance determined. When there is no current data session or the current data session has no data to be transmitted, evaluation packets containing predefined data is more appropriate to be used to determine performance. For example, in FIG. 3A, evaluation packets 311, 313, and 315 contain predefined information. The predefined information in evaluation packets 311a, 311b and 311c should be the same in order to have an accurate performance comparison for the first, second and third connections. Similarly, the predefined information in evaluation packets 313a, 313b and 313c should be the same and the predefined information in evaluation packets 315a, 315b and 315c should also be the same. Therefore in the time periods t-0 to t-1, t-2 to t-3 and t-4 to t-5, the data session is disrupted, interrupted, or paused for transmitting the evaluation packets. In one variant, the predefined information in evaluation packets 311, 313, and 315 is the same. For illustration purpose, when evaluation packets contain predefined information, the interval at which they are transmitted may be in the range of 5 seconds to 15 minutes. Preferably, the time period t-0 to t-2 may be in the range of 5 seconds to 15 minutes.

According to one of the embodiments of the present invention, data packets may be regarded as evaluation packets, such that data packets may also be used to determine performance of connections. For example, at about t-3, processing unit 201 determines the performance of the first connection based on the successful transmission of data-2 contained in data packets 312 and data-3 contained in evaluation packets 313a. Processing unit 201 determines the performance of the second connection and the third connection using based on the successful transmission of only data-3 contained in evaluation packets 313b and 313c respectively, because no data packets were transmitted through the second and third connection.

According to one of the embodiments of the present invention, size of each evaluation packet may be configured by the user or administrator. In some scenarios, some carriers may give higher priority to packets of smaller size, such that packets of smaller size may be transmitted earlier than packets of larger size. As smaller size packets may be transmitted sooner, it may be beneficial to configure the size of the evaluation packets to be smaller. Therefore the evaluated latency may be closer to the theoretical latency of the connection. If the size of only evaluation packets, and not all data packets, is configured to be small, the latency evaluated may be much lower than the real latency to be experienced when transmitting data packets. Thus the latency evaluated may not accurately represent the performance of the connection. To avoid this, size of all data packets and evaluation packets may be configured to be small.

Alternatively, the size of the evaluation packets and data packets may be configured to be larger. The total overhead may be reduced when the size of each packet is larger, since there are lesser number of packets for a given amount of data. Furthermore, the computing resources required for processing the packets may be reduced as the number of packets may be lesser.

Figure 3B:
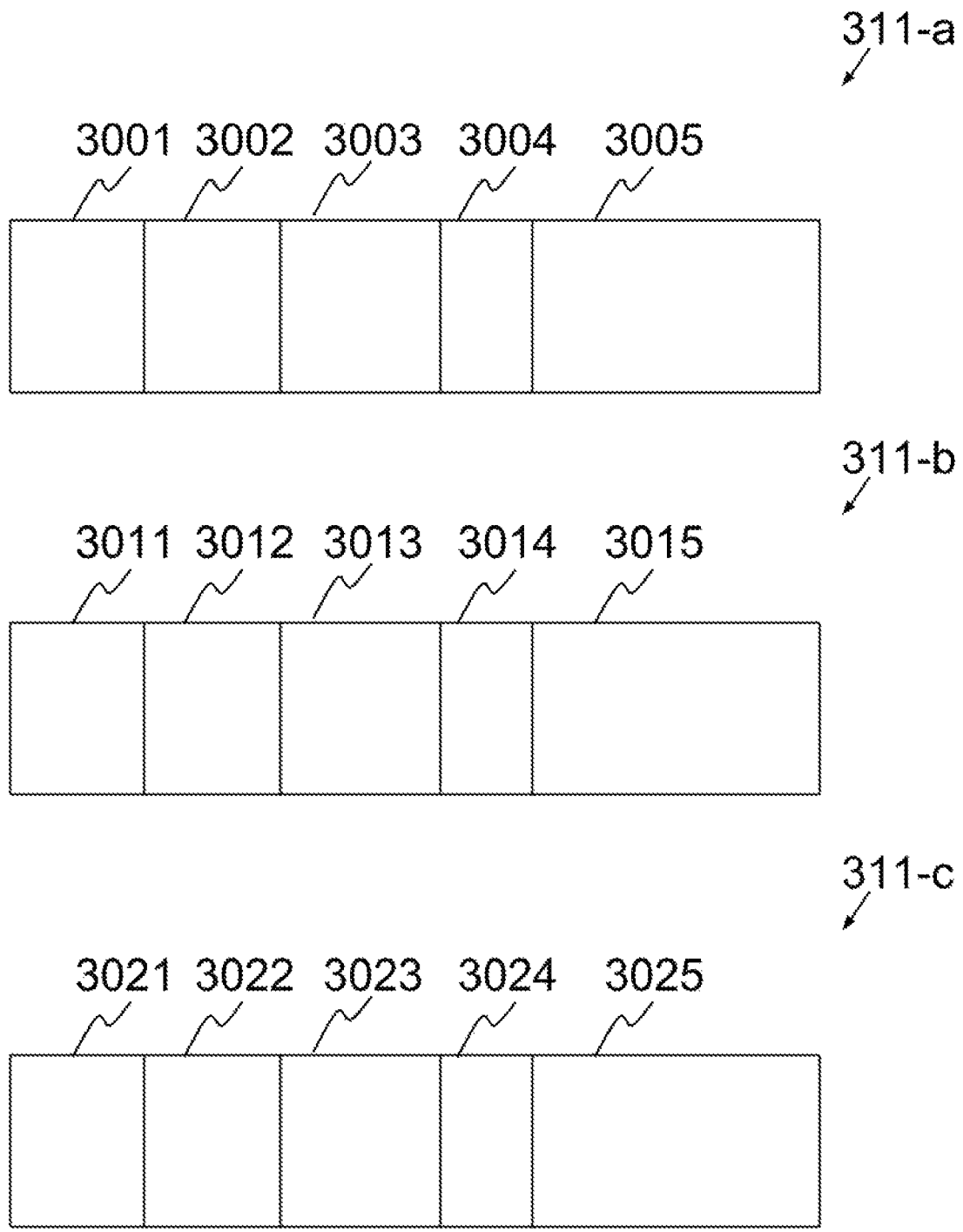
FIG. 3B illustrates timing graphs according to one of the embodiments of the present invention.

According to one of the embodiments of the present invention, evaluation packets have the same size or substantially the same size. For example, evaluation packets 311a, 311b and 311c all are consisted of five packets as illustrated in FIG. 3B. Evaluation packets 311a is consisted of packets 3001-3005; evaluation packets 311b is consisted of packets 3011-3015; and evaluation packets 311c is consisted of packets 3021-3025. Packets 3001, 3011 and 3021 all have the same size. Similarly, packets 3002, 3012 and 3022 all have the same size; packets 3003, 3013 and 3023 all have the same size; packets 3004, 3014 and 3024 all have the same size; and packets 3005, 3015 and 3025 all have the same size. Therefore evaluation packets 311a, 311b and 311c all have the same size. Using the same size or substantially same size evaluation packets for evaluation allows processing unit 201 to compare the performance of the connections more accurately. The contents of packets 3001-3025 may be the same, different or generated randomly. The contents of packets 3001-3025 may also belong to the same data session similar to other embodiments discussed earlier.

When a connection gets disconnected or fails while data packets are being transmitted through it, processing unit 201 then transmits evaluation packets for determining performance of all three connections. For example, the first connection fails at a time between t-1 and t-2, such as at t-6, while data packets 312 containing data-2 are being transmitted through it. Then processing unit 201 does not wait till t-2 to transmit evaluation packets 313 containing data-3 through all three connections. Instead, processing unit 201 transmits evaluation packets 313 through the first, second and third connections at about t-6. Then the performance of the three connections may be determined and data packets 314 containing data-4 are transmitted through one of the three connections according to the performance determined.

Alternatively, when the first connection fails, processing unit 201 transmits evaluation packets 313 only through the second and third connections at t-6 and determines the performance of the second and third connections. Then data packets 314 are transmitted through either the second or the third connection according to the performance determined. Performance of the first connection is not determined because the first connection has already failed, and may not be available for transmitting data packets immediately. This may also indicate that the first connection is less stable than others, and therefore irregularities in data transmission may be avoided by not using the first connection.

Figure 4:
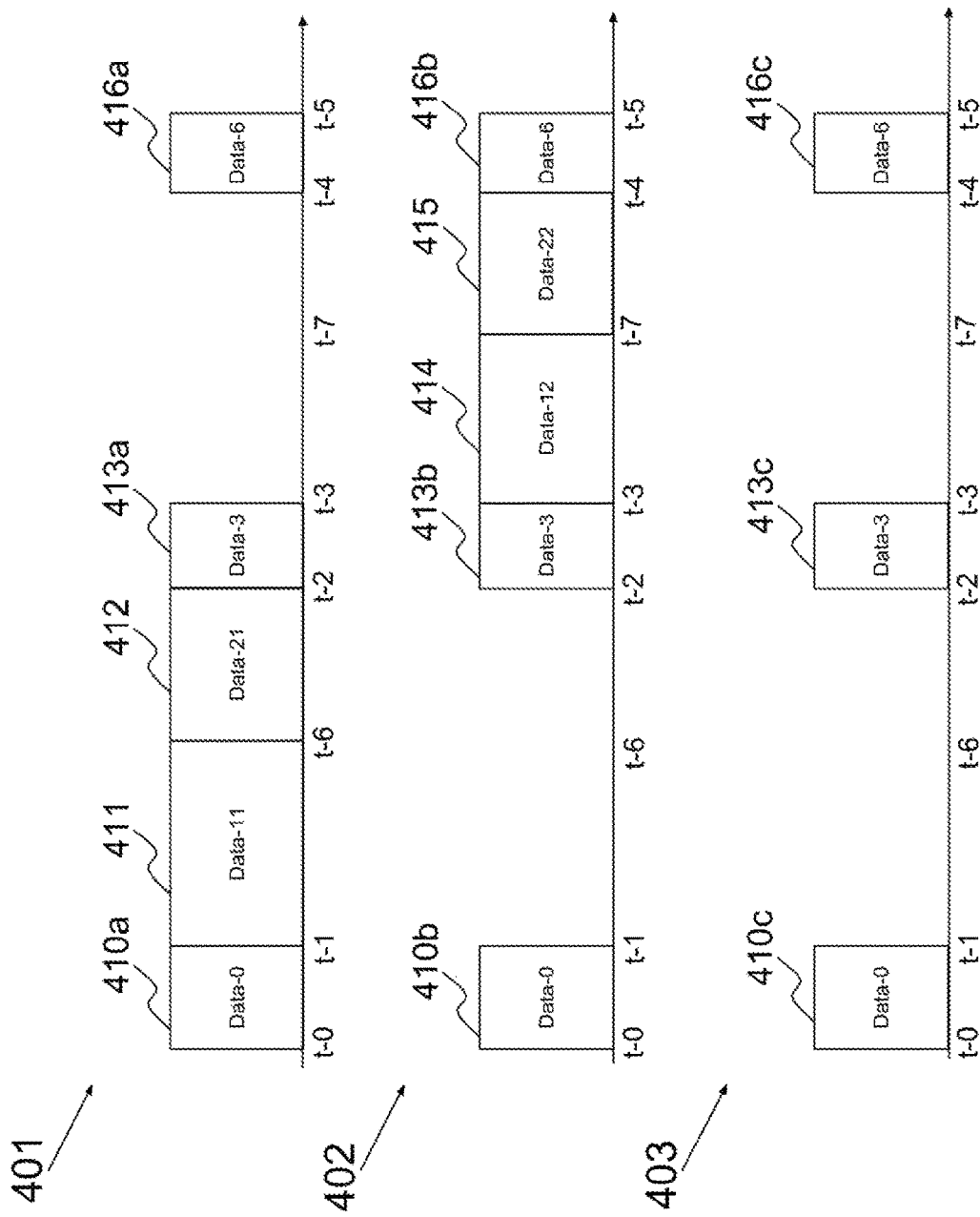
FIG. 4 illustrates timing graphs in which only one connection is used for transmitting data packets according to one of the embodiments of the present invention.

FIG. 4 illustrates an embodiment in which the connections are used to transmit data packets belonging to two data sessions concurrently. Timing graphs representing transmission of evaluation packets and data packets through connections at a communications device, such as communications device 106, according to one of the embodiments of the present invention. FIG. 4 is viewed in conjunction with FIG. 2 for better understanding. Timing graphs 401, 402 and 403 are for first, second and third connections respectively. Communications device 106 connects to the first, second and third connections through at least one of the plurality of network interfaces 205. Time instances are represented by t-0, t-1, t-6, t-2, t-3, t-7, t-4, and t-5 respectively.

Evaluation packets 410a, 410b and 410c are transmitted through the first, second and third connections respectively contain the same or substantially the same information data-0. Similarly, evaluation packets 413a, 413b and 413c contain the same or substantially the same information data-3. Similarly, evaluation packets 416a, 416b and 416c contain the same or substantially the same information data-6. As described earlier, contents of evaluation packets 410, 413 and 416 may belong to a data session, predefined or randomly generated. Also, as described earlier, size of evaluation packets 410a, 410b and 410c may be the same. The same also applies to evaluation packets 413 and 416.

For illustration purpose, data packets 411 and 414, containing data-11 and data-12 respectively, belong to a first data session. Data packets 412 and 415, containing data-21 and data-22 respectively, belong to a second data session. In one variant, evaluation packets 410, 413 and 416 belongs to either the first data session or the second data session. A user or administrator is able to select which data sessions to be used for evaluation packets. Alternatively, contents of evaluation packets 410, 413 and 416 do not belong to any data session and contain information that is predefined. In one variant, when a user or administrator of the communications device, such as communications device 106, gives higher preference to a particular data session, contents of evaluation packets 410, 413 and 416 belong to the particular data session with higher preference. The user or administrator may have higher preference for the particular data session for various reasons. For example, the user might want the information of the particular data session to be transmitted faster than the information of other data session(s). For example, the user gives higher preference to the first data session because the user wants the information of the first data session to be transmitted earlier than the information of the second data session. Evaluation packets 410, 413 and 416 then belong to the first data session. When evaluation packets 410, 413 and 416 carry information of the first data session, more information belonging to the first data session is being transmitted compared to information belonging to the second data session within a given time period. Therefore, it is more likely that information of the first data session is transmitted earlier than the information of the second data session, according to the user's preference.

At about t-0, evaluation packets 410a, 410b and 410c are transmitted through the first, second and third connections respectively for determining performance of the connections. At about t-1, processing unit 201 determines that the first connection has the best performance. Therefore data packets 411 belonging to the first data session are transmitted through the first connection at about t-1. At about t-6, communications device 106 can then start transmitting data packets 412 belonging to the second data session. Therefore, although there are two on going data sessions, communications device 106 only uses one connection at a given time for transmitting data packets. Evaluation packets 413a, 413b and 413c are transmitted through the first, second and third connections respectively for determining performance of the connections at about t-2. At about t-3, processing unit 201 determines that the second connection has the best performance. Therefore data packets 414 belonging to the first data session are transmitted through the second connection at about t-3. After data packets 414 have been transmitted at about t-7, processing unit 201 transmits data packets 415 belonging to the second data session and re-evaluate the performance of the first, second and third connections again at about t-4. Therefore evaluation packets 416, consisting of evaluation packets 416a, 416b and 416c, are transmitted through the first, second and third connections respectively for determining their performance.

As illustrated in FIG. 4, only one connection is used for transmitting data packets at a given time even when there are two data sessions. For clarification, this invention also applies to three or more data sessions. One of the benefits of this is that, if the connections are connected to or passing through the same network, the bandwidth available for one connection may be more or less the same as the bandwidth available for all the connections. In addition, using only one connection may reduce channel interference if the connections are wireless access connections. For example, while transmitting data packets 411 belonging to the first data session, the first connection could have bandwidth capacity that is not interfered by the second and third wireless access connections. Furthermore, the amount of processing power and computing resources required could be less when using one connection at a time compared to when using more than one connection at a time.

In one variant, the first, second and third connections are access connections, such as wireless access connections using Wi-Fi, LTE and/or 3G communications technologies. In one variant, the first, second and third connections are VPN tunnels between communications devices 106 and 108.

Figure 5:
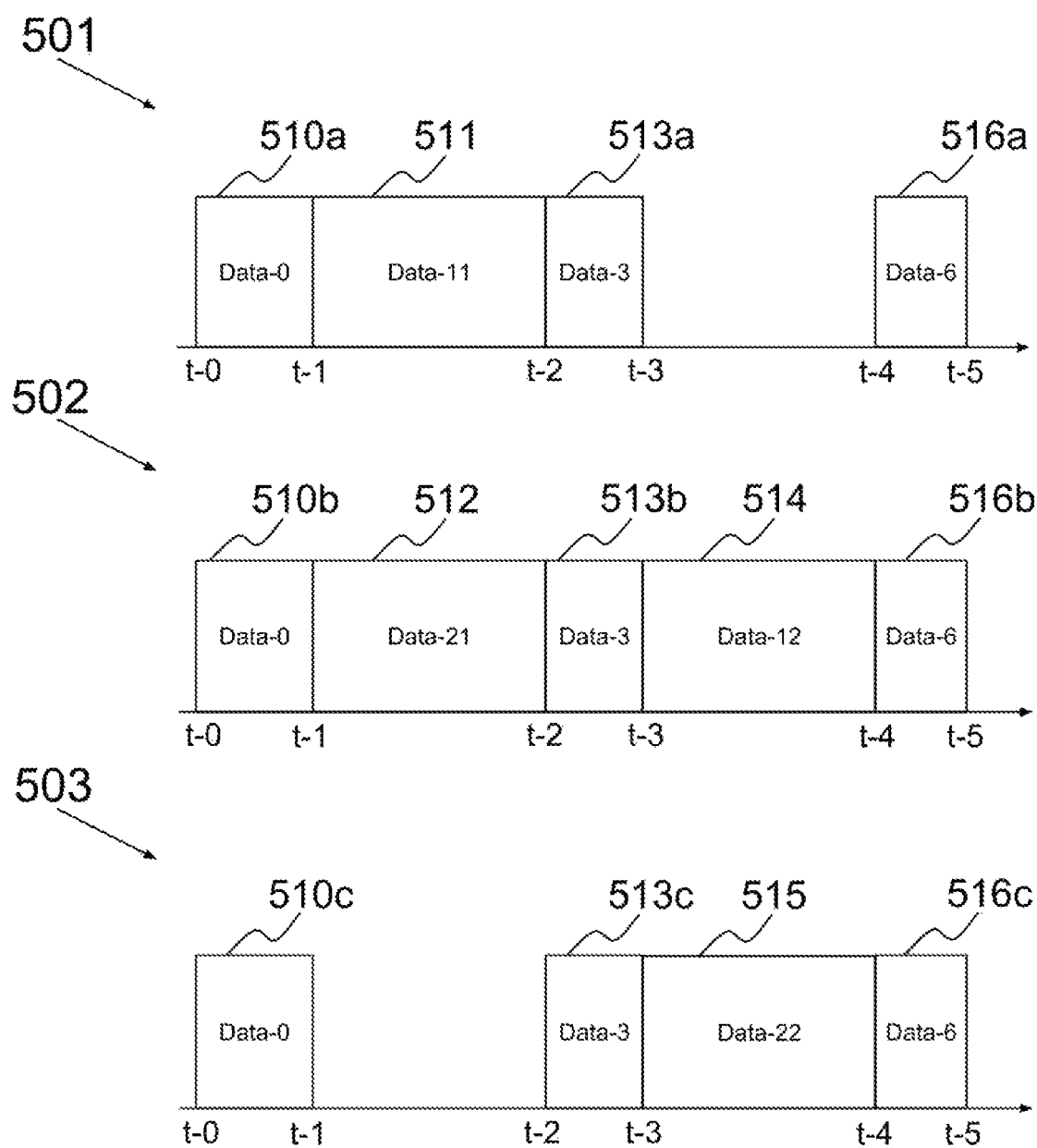
FIG. 5 illustrates timing graphs in which more than one connections are used for transmitting data packets according to one of the embodiments of the present invention.

FIG. 5 illustrates one of the embodiments of the present invention in which more than one connection is used to transmit data packets belonging to more than one data sessions. FIG. 5 should be viewed in conjunction with FIG. 2 for better understanding. Timing graphs 501, 502 and 503 are for first, second and third connections respectively. Communications device 106 connects to the first, second and third connections through at least one of the plurality of network interfaces 205. Time instances are represented by t-1, t-2, t-3, t-4, and t-5 respectively.

Evaluation packets 510a, 510b and 510c are transmitted through the first, second and third connections respectively and contain the same or substantially the same information data-0. Similarly, evaluation packets 513a, 513b and 153c contain the same or substantially the same information data-3. Similarly, evaluation packets 516a, 516b and 516c contain the same or substantially the same information data-6. Contents of evaluation packets 510, 513 and 516 may belong to a data session, predefined or randomly generated. Also, as described earlier, size of evaluation packets 510a, 510b and 510c may be the same. The same also applies to evaluation packets 513 and 516.

In FIG. 5, transmission of data packets belonging to two data sessions is illustrated. Therefore, data packets 511 and 514, containing data-11 and data-12 respectively, belong to a first data session. Data packets 512 and 515, containing data-21 and data-22 respectively, belong to a second data session. In one variant, evaluation packets 510, 513 and 516 belongs to either the first data session or the second data session. A user or administrator is able to select which data session the evaluation packets belong to. Alternatively, evaluation packets 510, 513 and 516 do not belong to any data session and contain information that is predefined.

At t-0, evaluation packets 510a, 510b, and 510c are transmitted through the first, second and third connections respectively for determining the performance of the connections. At about t-1, processing unit 201 determines that the first connection has the best performance, and the second connection has the second best performance. At about t-1, data packets 511 belonging to the first data session and data packets 512 belonging to the second data session are transmitted through the first connection and the second connection respectively.

In one variant, the user or administrator gives higher preference to the first data session. Therefore, processing unit 201 determines to transmit data packets 511 belonging to the first data session through the first connection which has the best performance because the user wants the first data session to be faster and more reliable. Data packets 512 belonging to the second data session are transmitted through the second connection which has the second best performance.

In one variant, the user or administrator does not have any preference for a particular data session. Therefore the first and second connections are used by processing unit 201 to transmit data packets belonging to the first or second data sessions randomly. Therefore, as an alternative to the illustration in FIG. 5, data packets 512 may be transmitted through the first connection instead of the second connection, and data packets 511 may be transmitted through the second connection instead of the first connection.

At about t-2, evaluation packets 513*a*, 513*b* and 513*c* are transmitted through the first, second and third connection respectively for determining the performance of the connections again. At about t-3, processing unit 201 determines that the second and third connections have the best performances.

In one variant, when the user or administrator gives higher preference to the first data session, data packets 514 belonging to the first data session are transmitted through the second connection because the second connection has the best performance, and data packets 515 belonging to the second data session are transmitted through the third connection.

Alternatively, if the user or administrator does not have any preference for a particular data session, the second and third connections are used to transmit data packets belonging to the first or second data sessions randomly. Therefore, as an alternative to the illustration in FIG. 5, data packets 515 may be transmitted through the second connection instead of the third connection, and data packets 514 may be transmitted through the third connection instead of the second connection.

In one variant, the user or administrator does not have any preference for a particular data session. A connection, such as the second connection, was determined to be one of the connections having the best performance after a preceding evaluation time period, i.e. t-0 to t-1. The second connection is again determined to be one of the connections having the best performance after the evaluation time period t-2 to t-3. In this case, it is preferred to not change the connection for a data session if possible. More precisely, since the second connection was being used to transmit data packets 512 belonging to the second data session from t-1 until t-2, the second connection is again used to transmit data packets 515 belonging to the second data session from t-3 until t-4. In this way, the second data session will be smoother, since the connection being used is not switched.

When two connections are used for transmitting data packets of two data sessions respectively, data packets of both the first and data sessions may be transmitted simultaneously by using load balancing technology. Since the two data sessions may be concurrent, it is likely that the transmission is complete faster compared to when only one connection is used for both data sessions, especially when the two connections are not connected to, or passing through the same network. However, there may be some interference caused by the use of two connections at the same time. The processing power and resources required are also higher when the connections are balanced.

Comparing FIG. 3A, FIG. 4 and FIG. 5, FIG. 3A illustrates the transmission of data packets belonging to one data session, where only one connection is used at a given time. On the other hand, FIG. 4 illustrates the transmission of data packets belonging to two data sessions and only one connection is used at a given time. FIG. 5 also illustrates the transmission of data packets belonging to two data sessions, but unlike FIG. 4, two connections are used at a given time for transmitting data packets belonging to the two data sessions respectively.

In one variant, after evaluation packets 510 and 513 are transmitted, processing unit 201 may have decided that all three connections have satisfied performance requirements and therefore may transmit data packets 511, 512, 514 and 515 through all three connections.

Figure 6:
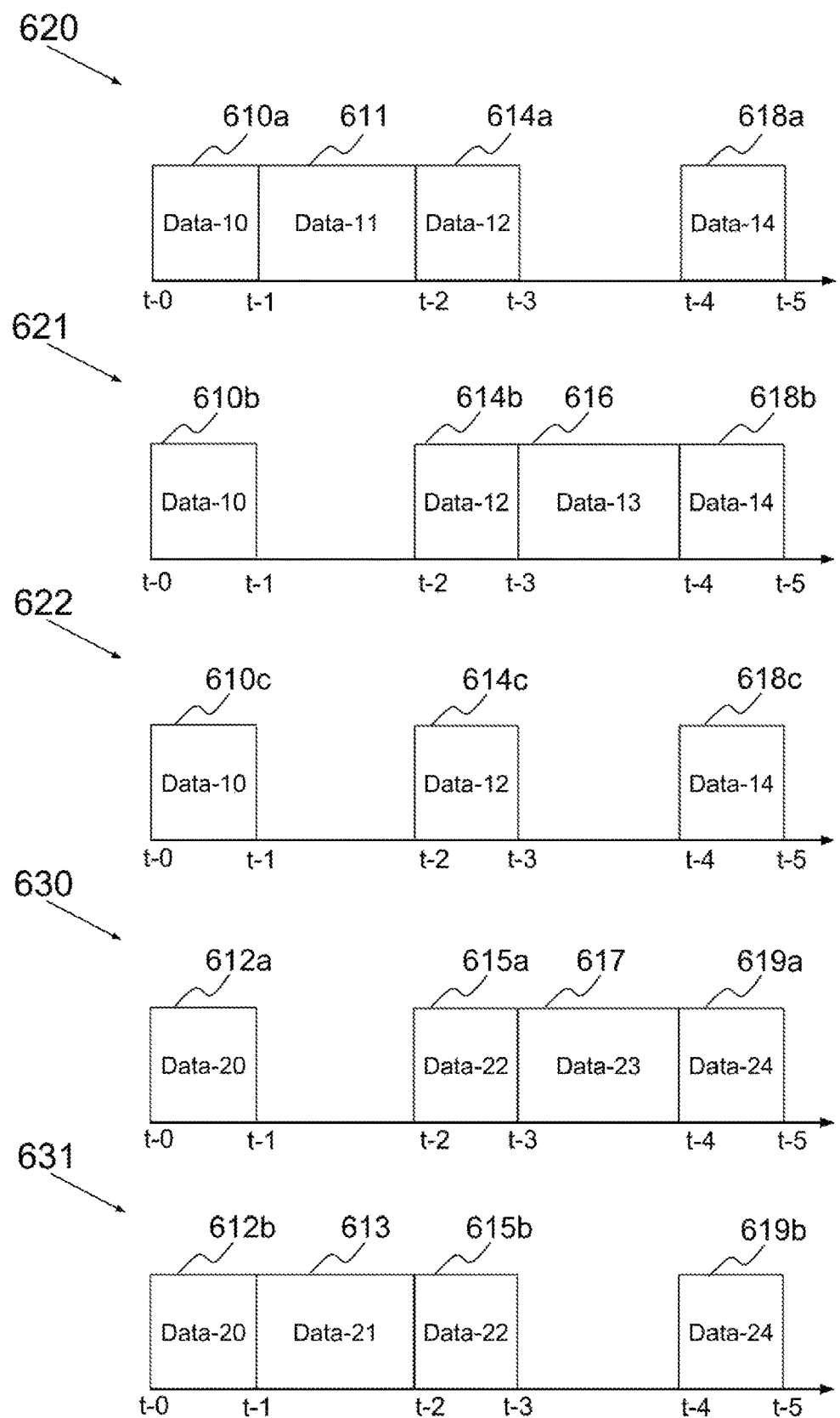
FIG. 6 illustrates timing graphs representing transmission of evaluation packets and data packets according to one of the embodiments of the present invention.

FIG. 6 illustrates timing graphs representing transmission of evaluation packets and data packets through connections at a communications device, such as communications device 106, according to one of the embodiments of the present invention. FIG. 6 is viewed in conjunction with FIG. 2 for better understanding. Timing graphs 620, 621, 622, 630 and 631 are for a first, second, third, fourth, and fifth connection respectively. Communications device 106 connects to the first, second, third, fourth, and fifth connections through at least one of the plurality of network interfaces 205. Time instances are represented by t-1, t-2, t-3, t-4, and t-5 respectively. In one variant, the first, second, third, fourth, and fifth connections are access connections connected to network interfaces 205 of communications device 106. In one variant, the first, second, third, fourth, and fifth connections are logical connections connected to communications device 106 through network interfaces 205.

The first, second, third, fourth and fifth connections are classified into two groups. The first, second and third connections belong to a first group and the fourth and fifth connections belong to a second group. Processing unit 201 selects one connection from each group for transmitting data packets. Therefore, processing unit 201 determines performance of the first group of connections, and selects one of the connections in the first group for transmitting data packets based on the performance. Similarly, processing unit 201 determines performance of the second group of connections, and selects one of the connections in the second group for transmitting data packets based on the performance. Performance of the first and second group of connections may be determined simultaneously or almost simultaneously.

The connections are classified by processing unit 201 into more than one group based on which specific types of data packets they are suitable for transmitting. Alternatively, the connections may be classified into groups according to a policy, for management purposes, according to historical performance evaluation, or any other reason for which having different groups of connections would be desirable. The user or administrator may choose more than one connection from each group for transmitting data packets. They can also choose not to use any connections from some groups for transmitting data packets. Therefore the scope of the invention is not limited to using one connection from each group for transmitting data packets.

Evaluation packets 610*a*, 610*b* and 610*c* transmitted through the first, second and third connections respectively contain the same or substantially the same information data-10. Similarly, evaluation packets 614*a*, 614*b*, and 614*c* contain the same or substantially the same information data-12. Similarly, evaluation packets 618*a*, 618*b* and 618*c* contain the same or substantially the same information data-14. Evaluation packets 612*a* and 612*b* transmitted through the fourth and fifth connections respectively contain the same or substantially the same information data-20. Similarly, evaluation packets 615*a* and 615*b* contain the same or substantially the same information data-22. Similarly, evaluation packets 619*a* and 619*b* contain the same or substantially the same information data-24. Evaluation packets 610, 614 and 618 are transmitted for determining the performance of the first group of connections. Evaluation packets 612, 615 and 619 are transmitted for determining the performance of the second group of connections. As described earlier, contents of evaluation packets 610, 614, 618, 612, 615 and 619 may belong to a data session, may be predefined or may be randomly generated. Also, as described earlier, size of evaluation packets 610*a*, 610*b* and 610*c* may be the same. The same also applies to evaluation packets 614, 618, 612 and 619.

Evaluation packets 610*a*, 610*b* and 610*c* are transmitted through the first, second, and third connections respectively at about t-1. Performance of the first group of connections is determined by transmitting evaluation packets 610 through all three connections of the first group. Processing unit 201 determines that performance of the first connection is the best among the first group of connections. Therefore, at about t-1, processing unit 201 determines to transmit data packets 611 containing data-11 through the first connection. Similarly, at about t-0, performance of the second group of connections is determined by transmitting evaluation packets 612*a* and 612*b* through the fourth and fifth connections respectively. At about t-1, processing unit 201 determines that the fifth connection has the best performance among the second group of connections. Therefore processing unit 201 determines to transmit data packets 613 containing data-21 at about t-1 through the fifth connection.

Processing unit 201 again determines the performance of the first group of connections by transmitting evaluation packets 614*a*, 614*b* and 614*c* through the first, second and third connections respectively at about t-2. At about t-3, processing unit 201 determines that the second connection has the best performance. Therefore, data packets 616 containing data-13 are transmitted through the second connection at about t-3. At the same time, the performance of the second group of connections is determined by transmitting evaluation packets 615*a* and 615*b* through the fourth and fifth connections respectively at about t-2. Processing unit 201 determines that the fourth connection has the best performance among the second group of connections at about t-3. Therefore data packets 617 containing data-23 are transmitted through the fourth connection at about t-3. At about t-4, evaluation packets 618*a*, 618*b* and 618*c* are transmitted through the first, second and third connections respectively and evaluation packets 619*a* and 619*b* are transmitted through the fourth and fifth connections respectively for determining the performance of the first and second group of connections respectively.

In one of the embodiments, the plurality of network interfaces 205 is classified into a first and a second group. Performance of connections connected to network interfaces in the first group is determined by transmitting evaluation packets 610, 614, and 618. Evaluation packets 610, 614 and 618 are transmitted through connections connected to network interfaces in the first group. Performance of connections connected to network interfaces in the second group is determined by transmitting evaluation packets 612, 615 and 619. Evaluation packets 612, 615 and 619 are transmitted through connections connected to network interfaces in the second group. One network interface is selected from each group for transmitting data packets according to the performance determined. Therefore, the network interface connected to the connection with the best performance is selected from each group.

At a given time, two connections are being used to transmit data packets at communications device 106. One of the two connections belongs to the first group, and another one of the two connections belong to the second group. In one variant, when the first, second, third, fourth, and fifth connections are logical connections, the two connections used for transmitting data packets are bonded together to form an aggregated connection. Alternatively, the two connections used for transmitting data packets are balanced. In one of the embodiments, the connections are classified into groups by processing unit 201 based on certain conditions. The conditions are stored in secondary storage 204. The conditions are selected from a group consisting of performance metric, service provider, usage metric, location, time, usage price, security, user, Internet Protocol address range, communication protocol, communication technology, application, and device. Connections may belong to a certain group if they satisfy conditions corresponding to the certain group. A connection may belong to more than one group.

In an example, viewing in conjunction with FIG. 6, there are two ongoing data sessions at communications device 106. A first data session between communications device 106 and 108 is a File Transfer Protocol (FTP) session, and a second data session between communications device 106 and 108 is a video conferencing session. The FTP session uses the first group of connections comprising the first, second and third connections, and the video conferencing session uses the second group of connections comprising the fourth and fifth connections. Evaluation packets 610*a*, 610*b*, and 610*c* have the same size. Evaluation packets 610*a*, 610*b*, and 610*c* may or may not have the same information. Evaluation packets having the same size are used to determine and compare performance of the connections accurately. Evaluation packets 612*a* and 612*b* have the same size. The same applies to evaluation packets 614, 615, 618 and 619. Data-10, data-12 and data-14 are predefined data contained in evaluation packets 610, 614 and 618 respectively. Data packets 611 and 616, containing data-11 and data-13 respectively, are packets of a file belonging to the FTP session. Therefore, while determining the performance of the connections, the FTP session is interrupted momentarily, and transmission of packets of the file resumes when the determining is complete. Data-20, data-21, data-22, data-23 and data-24 are a first, second, third, fourth, and fifth frame of the video conferencing session. At a given time, the connection(s) being used by the FTP session and the connection(s) being used by the video conferencing sessions are either balanced using load balancing technology or bonded to form an aggregated connection.

Comparing FIG. 6 with FIG. 4, both FIG. 6 and FIG. 4 illustrate the transmission of packets belonging to two data sessions. However, in FIG. 6, packets belonging to the two data sessions are transmitted through two connections classified into different groups. Evaluation packets transmitted through each group of connections may be different. At a given time, two connections are used for transmitting data packets. On the other hand, in FIG. 4, only one connection is used for transmitting data packets at a given time and the connections are not classified into different groups.

Comparing FIG. 6 and FIG. 5, both FIG. 6 and FIG. 5 illustrate the transmission of packets belonging to two data sessions and two connections may be used at a given time in both FIG. 6 and FIG. 5. The difference between FIG. 6 and FIG. 5 is the classification of connections into different groups in FIG. 6. Evaluation packets 610, 614 and 618 transmitted through the first group of connections contain data belonging to the first data session, and evaluation packets 612, 615 and 619 transmitted through the second group of connections contain data belonging to the second data session in some scenarios illustrated by FIG. 6. However, in scenarios illustrated in FIG. 5, evaluation packets transmitted through all connections contain the same data. Whether the same data belongs to the first data session or the second data session does not depend on the group which the connections belong to. Therefore, in FIG. 6, the evaluation for the different groups of connections may be carried out in different processes.

Furthermore, in FIG. 5, data packets belonging to the first and second data session are transmitted through any two connections determined to have the best performance. Whereas, in FIG. 6, data packets belonging to the first data session is transmitted through the connection having the best performance among the first group of connections, and data packets belonging to the second data session is transmitted through the connection having the best performance among the second group of connections.

The benefit of choosing one connection from each group, as illustrated in FIG. 6, may be that each group of connections may be optimal for transmitting a specific type of data packet. Since the first data session and the second data session may comprise data packets of different types, it may be desirable to transmit data packets belonging to different data sessions through connections of different groups. However, classifying the connections according to data type may consume high computing resources if there is a change in data types frequently.

In an alternative, FIG. 6 illustrates transmission of packets belonging to one data session. Therefore, data packets 611, 613, 616 and 617 belong to the same data session. Evaluation packets 610, 612, 614, 615, 618 and 619 may also belong to the same data session as data packets 611, 613, 616 and 617.

Figure 7:
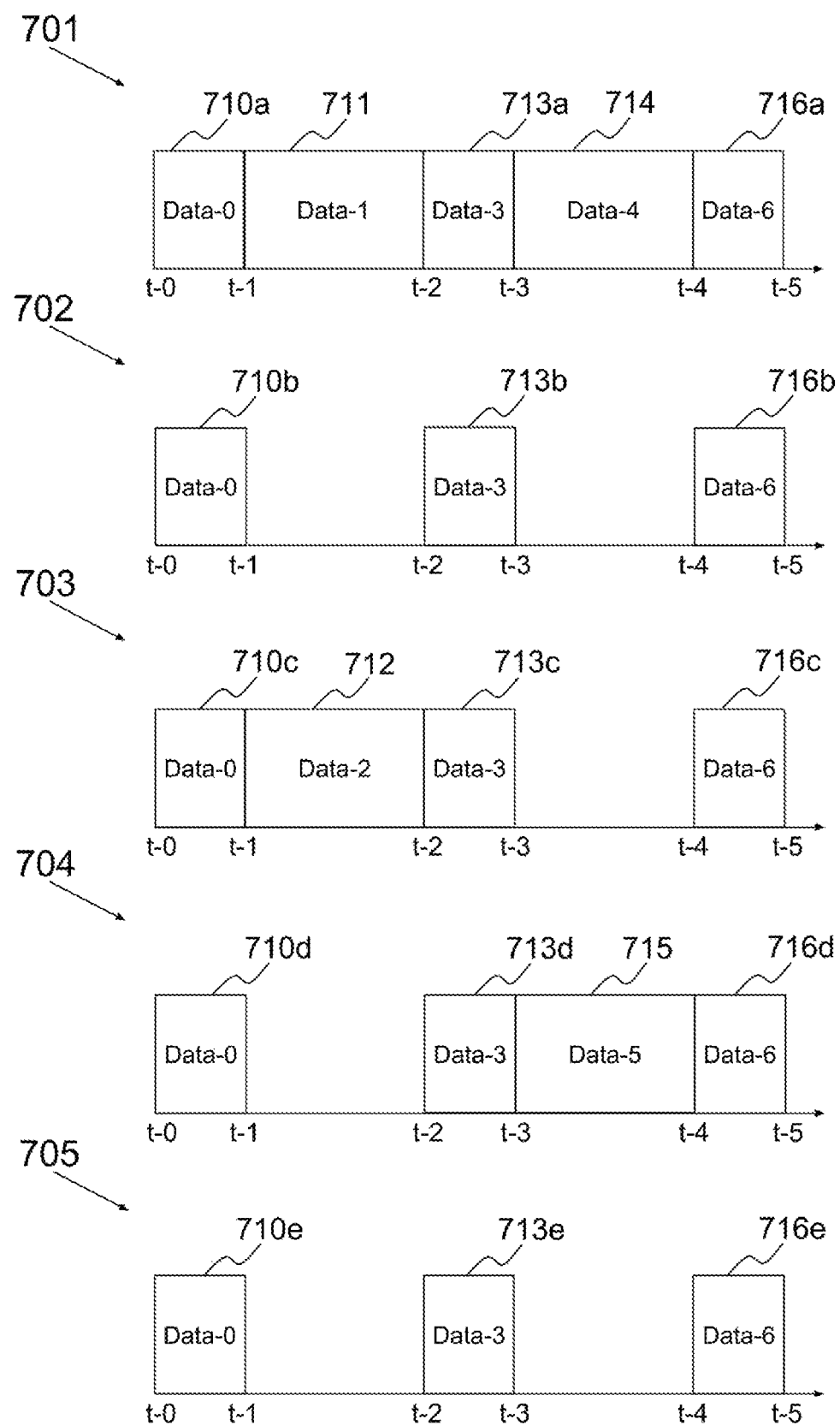
FIG. 7 illustrates timing graphs representing transmission of evaluation packets and data packets according to one of the embodiments of the present invention.

FIG. 7 illustrates timing graphs representing transmission of evaluation packets and data packets through logical connections at a communications device, such as communications device 106, according to one of the embodiments of the present invention. Timing graphs 701, 702, 703, 704 and 705 are for a first, second, third, fourth, and fifth logical connection respectively. Communications device 106 connects to the first, second, third, fourth, and fifth logical connections through at least one of the plurality of network interfaces 205. Time instances are represented by t-1, t-2, t-3, t-4, and t-5 respectively.

At a given time, communications device 106 uses two logical connections for transmitting data packets. The two logical connections are selected based on performance determined by processing unit 201. Performance of the five logical connections is determined by transmitting evaluation packets containing the same information through all five logical connections.

Evaluation packets 710a, 710b, 710c, 710d and 710e transmitted through the first, second, third, fourth and fifth logical connections respectively contain the same or substantially the same information data-1. Similarly, evaluation packets 713a, 713b, 713c, 713d and 713e contain the same or substantially the same information data-3. Similarly, evaluation packets 716a, 716b, 716c, 716d and 716e contain the same or substantially the same information data-6. Evaluation packets 710, 713 and 716 are transmitted by processing unit 201 for determining performance of the logical connections. As described earlier, contents of evaluation packets 710, 713 and 716 may belong to a data session, predefined or randomly generated. Also, as described earlier, size of evaluation packets 710a, 710b and 710c may be the same. The same also applies to evaluation packets 713 and 716.

Processing unit 201 determines to transmit evaluation packets 710a, 710b, 710c, 710d and 710e through the first, second, third, fourth and fifth logical connections respectively at about t-0. At about t-1, processing unit 201 determines performance of the five logical connections and selects the two logical connections with best performance, namely the first and third logical connections, for transmitting data packets. For example, the third logical connection has the best performance and the first logical connection has the second best performance. Therefore, data packets 711 containing data-1 and data packets 712 containing data-2 are transmitted through the first and third logical connection respectively at about t-1.

Processing unit 201 re-determines performance of the five logical connections by transmitting evaluation packets 713a, 713b, 713c, 713d and 713e through the first, second, third, fourth and fifth logical connections at about t-2. The performance of the first logical connection continues to be one of the best among the five logical connections. Therefore data packets 714 containing data-4 are transmitted through the first logical connection at about t-3. At the same time data packets 715 containing data-5 are transmitted through the fourth logical connection because the fourth logical connection is determined to be another one of the logical connections having the best performance among the five logical connections. Evaluation packets 716 are transmitted at about t-4 for determining the performance of the five logical connections again.

In an example, communications device 106 transmits Voice over Internet Protocol (VoIP) packets belonging to a VoIP session through an aggregated connection to communications device 108. It would be known to those skilled in the art that latency of connections is preferred to be lower than about 500 milliseconds in order to achieve proper quality of the VoIP session. The aggregated connection comprising the first, second, third, fourth, and fifth logical connection which are VPN tunnels. Evaluation packets 710a, 710b, 710c, 710d, and 710e have the same size, and contain the same information data-0. The same applies to evaluation packets 713 and 716. Evaluation packets 710, data packets 711, data packets 712, evaluation packets 713, data packets 714, data packets 715, and evaluation packets 716 are VoIP packets belonging to the VoIP session. Furthermore, data-0, data-1, data-2, data-3, data-4, data-5 and data-6 may be encapsulated in encapsulating packets that contain encryption information associated with the authentication required to connect to the VPN tunnels. Connections with a latency lower than about 500 milliseconds may be selected for transmitting VoIP packets.

In one of the embodiments, evaluation packets 710, 713, and 716 are transmitted through the plurality of network interfaces 205 to determine performance of logical connections established through the plurality of network interfaces 205. One or more network interfaces connecting to the connections determined to have the best performance are selected for transmitting data packets. At least one logical connection established through the network interfaces selected is used to transmit data packets. For example, a first network interface is determined to have the best performance. The first network interface is connected to a first and second logical connection. Processing unit 201 determines to use at least one of the first and second logical connection to transmit data packets.

Comparing FIG. 7 with FIG. 3A, both the figures illustrate transmission of packets belonging to one data session. The difference is that, in FIG. 7, two logical connections are used for transmitting data packets at a given time and in FIG. 3A, one connection is used for transmitting data packets at a given time. The benefit of the scenarios illustrated in FIG. 7 is that higher bandwidth is available for the data session since more than one logical connection are used for transmitting data packets. In FIG. 7, since data packets belonging to one data session are transmitted through more than one logical connection, the logical connections are bonded to form an aggregated connection. In FIG. 3A, the connections may be logical connections or access connections. However, in FIG. 7, only logical connections are used, and access connections cannot be used because access connections cannot be aggregated.

In an alternative, FIG. 7 illustrates transmission of packets belonging to two data sessions. Therefore, data packets 711 and 712 may belong to different data sessions. Similarly, data packets 714 and 715 may belong to different data sessions.

In FIG. 3A, FIG. 4, FIG. 5, FIG. 6 and FIG. 7, the reason why the performance of the connections is determined periodically, for example, once at t-0, again at t-2 and again at t-4 is that the performance may change from time to time. In many scenarios, the performance of connections, especially those connecting to wireless networks, is not stable and some connections have satisfactory performance at one time and unsatisfactory performance at another time. In a preferred embodiment, when performance of the connections is determined, the time period between determinations of the performance is within the range of five seconds to one minute. Performance is determined periodically every five seconds to one minute for adapting to changes in network environment because performance of connections may change every few seconds. Therefore the time period t-0 to t-2 and the time period t-2 to t-4 is in the range of five seconds to one minute. Alternatively, when performance of the connections is determined in order to check for connection failure, the time period allowed between evaluations of the performance is preferably within the range of half an hour to one hour. Therefore the time period t-0 to t-2 and the time period t-2 to t-4 is in the range of half an hour to one hour. The process is continued after t-5. FIG. 3A, FIG. 4, FIG. 5, FIG. 6 and FIG. 7 are just illustrations of how data packets are transmitted through each of the connections for determining performance of the connections periodically and selecting one of the connections for transmitting data packets based on the performance determined. After t-5, processing unit 201 chooses connection(s) for transmitting data packets based on the performance of the connections determined at about t-5. Hence, it should be noted that the process does not end after t-5.

In another example, in FIG. 7, evaluation packets 710, 713, and 716 belong to the same data session as data packets 711, 712, 714 and 715. Therefore the evaluation packets and the data packets are transmitted in the data session and each of the packets has a sequence number so that communications device 108, which is the receiving device, can arrange them accordingly.

The evaluation packets and data packets are assigned with a corresponding sequence number. The sequence number is in the information contained in the evaluation packets. When evaluation packets and data packets are assigned with a corresponding sequence number, the designated host or node arranges the packets arriving at the designated host or node according to their corresponding sequence numbers. When evaluation packets, belonging to the a data session, contain the same or substantially same information and arrive at a designated host or node, the designated host or node is capable of recognizing that the evaluation packets contain the same or substantially same information based on, at least in part, the sequence number. The designated host or node may choose to ignore, drop, discard or process evaluation packets arriving after the first evaluation packets. They may choose to process it for statistical purposes, such as monitoring performance and keeping records of the performance. The information is contained or encapsulated in the payload of the evaluation packets.

According to one of the embodiments, evaluation packets for determining performance of the connections are transmitted through the connections for a first predefined time period. When a connection is selected for transmitting data packets based on its performance, data packets are transmitted through the connections for a second predefined time period. For example, viewing FIG. 3A, FIG. 4, FIG. 5, FIG. 6 or FIG. 7, the first predefined time period is equal to the time period between t-0 and t-1, t-2 and t-3, or t-4 and t-5. In one variant, time period between t-0 and t-1 is a little longer than time period between t-2 and t-3 or between t-4 and t-5 because initialization time of the connection is included in the time period between t-0 and t-1. In one variant, time periods t-0 to t-1, t-2 to t-3 and t-4 to t-5 are not the same, but each of them are predefined. In one variant, time period between t-0 and t-1, t-2 and t-3, and t-4 and t-5 are the same, and are predefined. Similarly, the second predefined time period is equal to the time period between t-1 and t-2, or t-3 and t-4. In one variant, time periods t-1 to t-2, and t-3 to t-4 are not the same, but each of them are predefined. Alternatively, time periods t-1 to t-2, and t-3 to t-4 are the same and are predefined. The respective predefined time periods may be set by a user, manufacturer or administrator of communications device 106. In one variant, the user sets the predefined time period through a web interface, an application programming interface (API), a command line interface or a console. Processing unit 201 retrieves the predefined time periods locally from secondary storage 204 or remotely from a remote server.

In one of the embodiments, frequency of determining performance of connections at a communications device, such as communications device 106, is low if the connections are stable. Therefore, evaluation packets are transmitted less often. The time period for which data packets are transmitted continuously is significantly longer compared to when the connections are not stable. When the connections are stable, a connection determined to have the best performance after an evaluation is more likely to continue having the best performance for a longer time. Alternatively, when the connections are unstable, a connection determined to have the best performance after an evaluation is less likely to continue having the best performance for a long time. It would be known to those skilled in the arts that the performance may change at any moment every 5 seconds. Therefore, when the connections are stable, determining performance of connections is performed less often and data packets are transmitted continuously for a longer time period. When the connections are unstable, determining performance of connections is performed more often and data packets are transmitted continuously for a shorter time period. This is particularly important for wireless communications, as the connections are more likely to be unstable in wireless communications.

In one of the embodiments, evaluation packets are transmitted for a longer time period. For example, the time period between t-0 and t-1 is long. The benefit of transmitting evaluation packets for a longer time period is that the evaluation of performance gives better results. This is because more number of evaluation packets may be transmitted in the time period, and therefore the evaluation is more reliable. However, transmitting evaluation packets for a longer time period causes communications device 106 to use up more bandwidth for evaluation, and since evaluation packets are transmitted through multiple connections, the increase in bandwidth usage may be significant. In addition to that, if the evaluation packets contain information that is predefined and does not belong to a data session, the flow of data transmission will be disrupted, interrupted or paused for a longer period of time, and that may be undesirable. When there are two ongoing data sessions and evaluation packets belong to a first data sessions, a second data session is disrupted for a longer time period, which is not desirable in most scenarios. Alternatively, evaluation packets are transmitted for a shorter time period. Therefore, less bandwidth is consumed during evaluation of the performance of the connections. In one variant, transmitting evaluation packets for a shorter time period is also desirable when evaluation packets contain information that is predefined and does not belong to a data session because the flow of data transmission is disrupted for a shorter period of time. However, since less number of evaluation packets may be transmitted in a shorter time period, the evaluation may not be reliable enough.

In one of the embodiments of the present invention, when two or more logical connections are selected for transmitting data packets, the two or more logical connections are bonded to form an aggregated connection. The two or more logical connections are bonded only if the packets transmitted through them belong to the same data session. The two or more logical connections are end-to-end connections that are formed between the same two nodes, wherein communications device 106 is one of the two nodes. To form an aggregated connection, the data packets encapsulate packets before being transmitted through the two or more logical connections. The packets may originate from communications device 106 and/or from host(s) and/or node(s) connecting to communications device 106. Using an aggregated connection is beneficial for having a higher overall bandwidth which is a combined bandwidth of the individual logical connections. The aggregated connection is perceived as one logical connection by sessions or applications that are using it. For example, viewing in conjunction with FIG. 7, in the time period t-1 to t-2, the first and third logical connections are being used to transmit data packets. Therefore the first and third logical connections are bonded together to form an aggregated connection. Similarly, in the time period t-3 to t-4, the first and fourth logical connections are bonded and are comprised in the aggregated connection. The third logical connection may still be comprised in the aggregated connection, but it is not used for transmitting data packets. Alternatively, the third logical connection is removed from the aggregated connection when it is not being used to transmit data packets. This may apply to FIG. 6 also, where two connections selected for transmitting data packets at a given time are bonded together to form an aggregated connection.

Alternatively, when two or more connections are selected for transmitting data packets, the two or more connections are balanced. The two or more connections are balanced preferably when the data packets transmitted through them belong to different data sessions. The data packets are distributed among and transmitted through the two or more connections using load balancing technology, or any other technology that allows data packets to be distributed and transmitted among multiple connections. For example, viewing in conjunction with FIG. 7, from t-1 to t-2, data packets are distributed among and transmitted through the first and third logical connections. Similarly, from t-3 to t-4, data packets are distributed among and transmitted through the first and fourth logical connections. This may apply to FIG. 6 also, where data packets are distributed among and transmitted through the two connections, belonging to two different groups, and selected for transmitting data packets at a given time.

In the embodiments described herein, performance of connections are determined according to at least one of the following criteria: throughput, error rates, packet latency, packet jitter, symbol jitter, quality of service, security, coverage area, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio. For example, when performance is determined according to the dropped packet rate, the connection which has the least dropped packet rate is determined to have the best performance. In another example, when performance is determined according to the throughput, the connection with the highest throughput is determined to have the best performance. Performance may be determined according to more than one criterion.

In one variant, a user or administrator may configure communications device 106 to determine performance according to a certain criterion. If the user or administrator chooses bandwidth, bandwidth of connections will be evaluated, and connection(s) with highest bandwidth(s) will be selected for transmitting data. If the user or administrator chooses latency, latency of connections will be evaluated, and connection(s) with lowest latency will be selected for transmitting data.

Figure 8A:
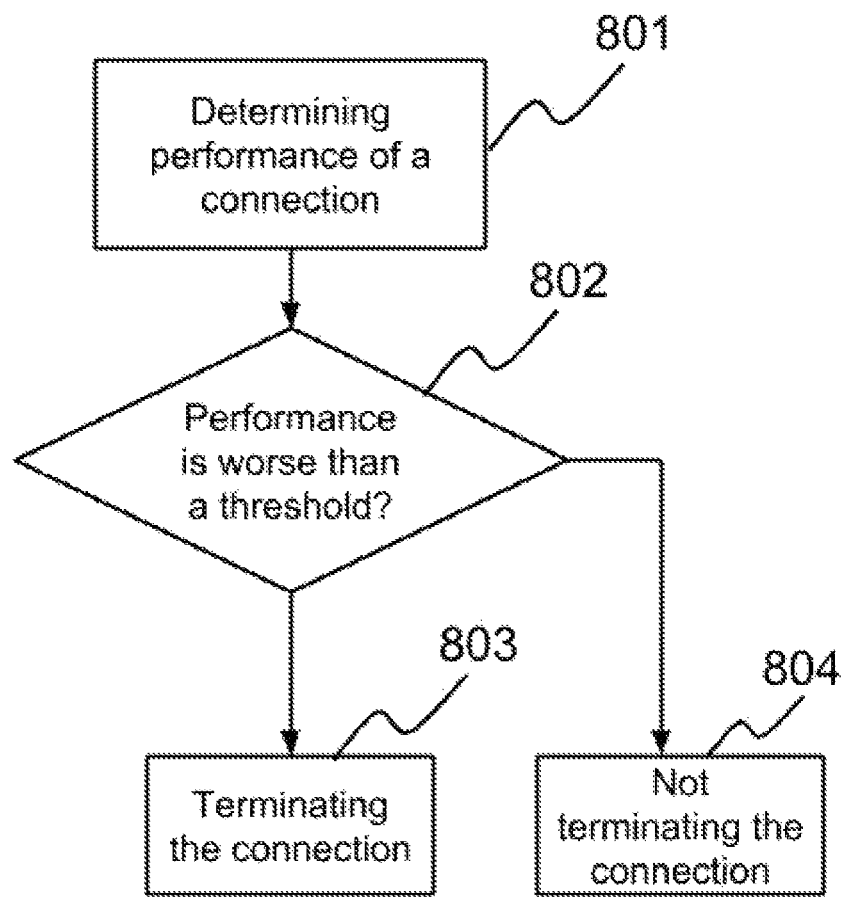
FIG. 8A is a flowchart illustrating a process according to one of the embodiments of the present invention.

FIG. 8A is a flowchart illustrating a process according to one of the embodiments of the present invention. Processing unit 201 determines the performance of a connection in step 801 by transmitting evaluation packets through the connection. If it is determined in step 802 that the performance of the connection is worse than a threshold, the connection is terminated in step 803. Alternatively, if the performance is determined not to be worse than the threshold, the connection is not terminated in step 804. When the connection is terminated, evaluation packets are no longer transmitted through the connection, and hence the performance of the connection is not determined again. Computing resources and bandwidth resources may be saved by not performing determination of the performance of the connection. For example, viewing in conjunction with FIG. 3A, processing unit 201 determines the performance of the third connection in step 801 by transmitting evaluation packets 311c. In step 802, processing unit 201 determines that the performance of the third connection is worse than the threshold. Therefore the third connection is terminated in step 803 and evaluation packets 313c and 315c are not transmitted through the third connection.

Figure 8B:
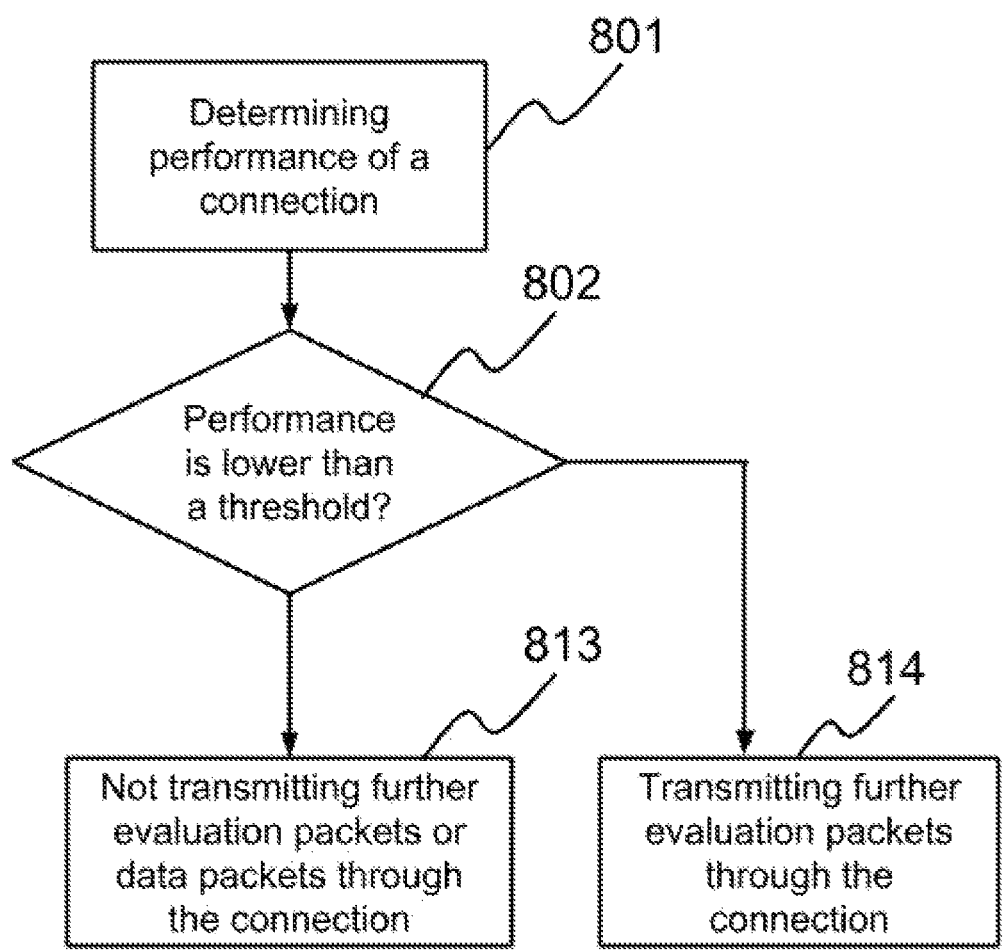
FIG. 8B is a flowchart illustrating a process according to one of the embodiments of the present invention.

In a preferred embodiment, as illustrated in FIG. 8B, if the performance of the connection is worse than the threshold, the connection is not terminated, but further evaluation packets or data packets are not transmitted through the connection in step 813. If the performance of the connection is determined not to be worse than the threshold, the connection is not terminated and further evaluation packets are sent through the connection as well in step 814. The benefit of performing step 813 instead of step 803 is that when a user or administrator wants to use the connection later on, they would not need to establish the connection again. Establishing a connection may take some time and computing resources. Therefore, the connection is not terminated and is just not allowed to be used to transmit further evaluation packets or data packets.

The threshold may be predefined and stored in a storage medium, such as secondary storage 204 or main memory 202. The threshold may be set by a user or administrator of communications device 106. The threshold may be part of settings required to establish the connection.

If the performance of a connection is worse than a threshold, terminating a tunnel or not sending evaluation packets through the connection may be beneficial for saving bandwidth resources and other computing resources.

Figure 9:
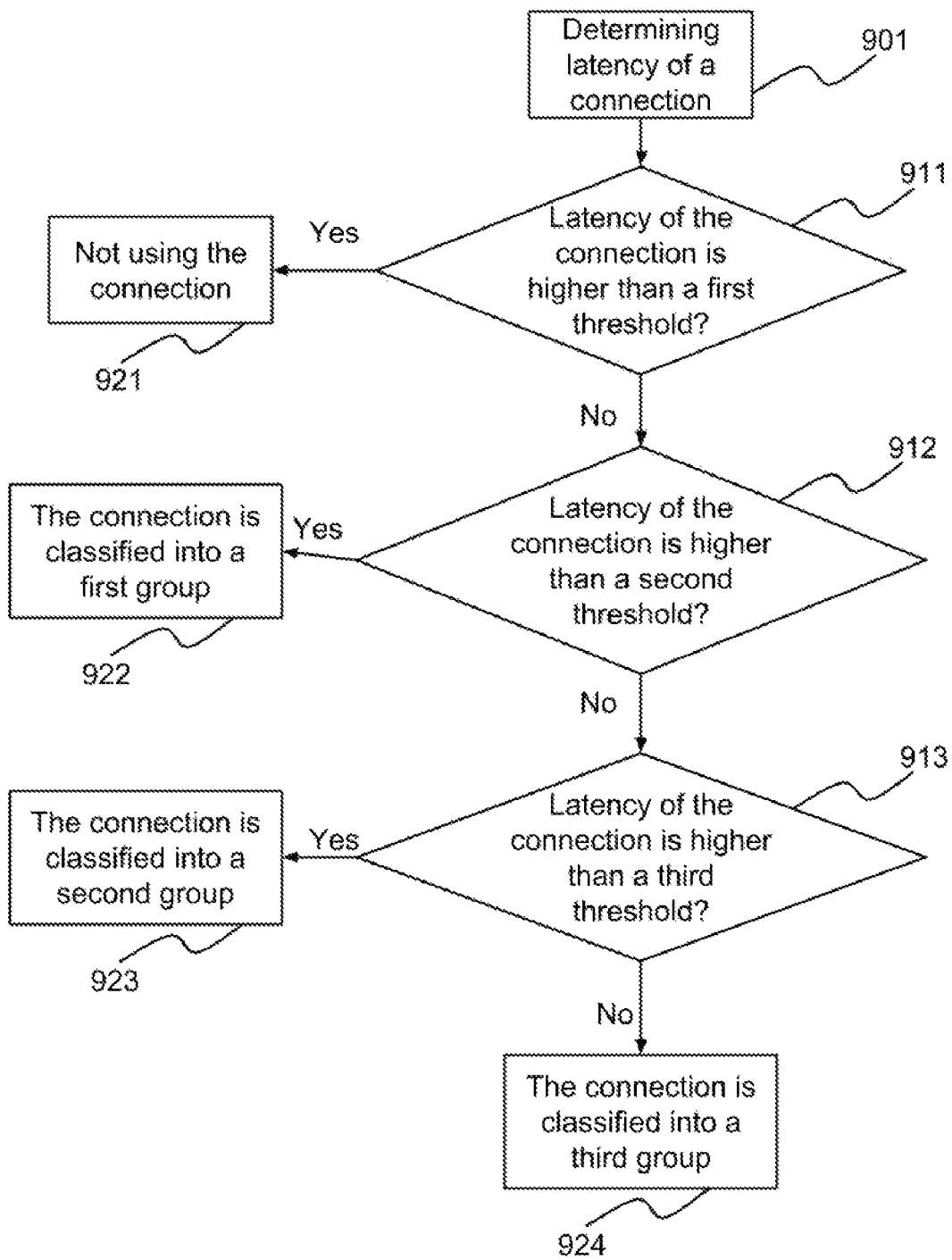
FIG. 9 is a flowchart illustrating a process according to one of the embodiments of the present invention.

FIG. 9 is a flowchart illustrating a process according to one of the embodiments of the present invention. Latency requirement of data packets is determined and connections are selected for transmitting the data packets based on the latency requirement of the data packets. For illustration purposes, since latency requirement of data packets belonging to voice traffic may be less than about 500 milliseconds, data packets belonging to voice traffic are only transmitted through connections with latency less than about 500 milliseconds. Referring to FIG. 9, in step 901, latency of a connection is determined by transmitting evaluation packets through the connection. If processing unit 201 determines in step 911 that the latency of the connection is higher than a first threshold, the connection is terminated or determined not to be used to transmit packets in step 921. Preferably, the first threshold is about 1000 milliseconds, such that, if the latency of the connection is higher than 1000 milliseconds, the connection is determined not to be used in step 921. If the latency is not higher than the first threshold, processing unit 201 determines whether the latency is higher than a second threshold in step 912. If the latency is higher than the second threshold, the connection is classified into a first group in step 922. Connections in the first group are allowed to be used for any traffic other than video traffic and voice traffic. Preferably, the second threshold is about 800 milliseconds. Connections in the first group, such as the connection, with latency higher than about 800 milliseconds are not good for video transmission or voice transmission because of the high latency. Therefore they are not used for video traffic and voice traffic, but they may be used for any other type of traffic for which latency higher than about 800 milliseconds may be tolerated. If the latency of the connection is not higher than the second threshold, the connection may be allowed to be used for video traffic. At step 913, processing unit 201 determines whether the latency of the connection is higher than a third threshold. The connection is classified into a second group in step 923 if the latency is higher than the third threshold. The third threshold is preferably about 500 milliseconds. Connections in the second group are allowed to be used for video transmission but not for voice transmission, as quality of video transmission may be satisfactory with latency higher than about 500 milliseconds and lower than about 800 milliseconds, but quality of voice transmission may be very poor with latency higher than about 500 milliseconds. If the connection has latency not higher than the third threshold, the connection is classified into a third group. Connections in the third group are allowed to be used for video transmission and voice transmission, as quality of voice transmission may be satisfactory with latency lower than about 500 milliseconds. The first, second and third thresholds are configurable and may be configured by the user or administrator of communications device 106.

According to one of the embodiments of the present invention, if the difference in latency between two or more connections in an aggregated connection is higher than a latency discrepancy threshold, one or more connections with comparatively high latency is terminated, or packets are not transmitted through the one or more connections. For illustration purposes, the latency discrepancy threshold is about 500 milliseconds. The latency of a first connection is 400 milliseconds and the latency of a second connection is 950 milliseconds. Since the difference in latency between the first and second connection is higher than about 500 milliseconds, the second connection is terminated or not used for transmitting data packets. In another illustration, the latency of a first, second and third connection is 400, 950 and 980 milliseconds respectively, and the latency discrepancy threshold is about 500 milliseconds. Since the differences in latency between the first connection and both the second and third connections is higher than about 500 milliseconds, the second and third connections are no longer used for transmitting data and may be terminated. In another illustration, when the latency of the first connection is approximately 10 milliseconds and the latency of the second connection is approximately 200 milliseconds, the second connection is no longer used for transmitting data packets and may be terminated. When packets are being transmitted from communications device 106 to communications device 108 through an aggregated connection comprising the first connection and the second connection, a first packet transmitted through the first connection may arrive much earlier than a second packet transmitted through the second connection. Even if a third packet and a fourth packet arrive early through the first connection, communications device 108 only acknowledges the arrival of the first packet, and since the second packet has not arrived, all three of the second, third and fourth packet are transmitted again. Therefore, resources may be saved by terminating the second connection or not using the second connection, so that all four of the first, second, third and fourth packets are transmitted through the first connection and packets do not need to be retransmitted.

In one variant, the second connection may be used for transmitting any packets other than data packets, such as health-check packets, evaluation packets, etc. If the latency of the second connection is later determined to become lower, then the second connection may again be used for transmitting data packets. In order to monitor the latency of the second connection, communications device 106 does not terminate the second connection and continues sending evaluation packets through the second connection even after determining that the difference in latency is higher than the latency discrepancy threshold.

In one variant, the latency discrepancy threshold is predefined and may be set by a user or administrator of communications device 106. Alternatively, the latency discrepancy threshold may be set periodically by processing unit 201. Alternatively, the latency discrepancy threshold may be set dynamically or automatically by processing unit 201 based on, at least in part, the average latency of two or more connections in the aggregated connection. The average latency may be calculated based on latency values evaluated within a specific time period. The specific time period may be in the range of 10 milliseconds to 5 minutes. The latency discrepancy threshold may be set as percentage value of the average latency. For illustration purposes, the latency discrepancy threshold may be set to 20% of the average latency of all connections of the aggregated connection. When latencies experienced by a first, second and third connections are about 400 milliseconds, 500 milliseconds, and 900 milliseconds respectively, the average latency is about 600 milliseconds. The latency discrepancy threshold may then be set dynamically to 20% of 600 milliseconds, which is 120 milliseconds. Since the difference between the latency of the third connection and the average latency is more than 120 milliseconds, processing unit 201 may determine not to use the third connection for transmitting data packets. The percentage value may be configured by a user or administrator. In another illustration, the latency discrepancy threshold may be set to 30% of the average latency of connections with comparatively low latencies, and not all connections in the aggregated connection. When latencies experienced by a first, second and third connections are about 400 milliseconds, 500 milliseconds, and 900 milliseconds respectively, the average latency of connections with comparatively low latency is 450 milliseconds. The latency discrepancy threshold may be automatically set by processing unit 201 to 30% of 450 milliseconds, which is 135 milliseconds. Since the difference between the latency of the third connection and the average latency is more than 135 milliseconds, processing unit 201 may determine not to use the third connection for transmitting data packets. In another variant, a user or administrator of communications device 106 may define policies for dynamically setting the latency discrepancy threshold. For illustration, a policy is defined such that if average latency of connections with comparatively low latency is less than 100 milliseconds, the latency discrepancy threshold is dynamically set to 100 milliseconds. The policy may further be defined such that if the average latency of connections with comparatively low latency is between 100 to 500 milliseconds, the latency discrepancy threshold is dynamically set to 400 milliseconds. It should be appreciated that these values are exemplary and there may be various other ways of dynamically setting the latency discrepancy threshold. Connections with comparatively low latencies may include any connections except the connection with the highest latency. Alternatively, connections with comparatively low latencies may include any connections which have latencies within a certain range of the lowest latency.

When there are more than two connections, the latency discrepancy threshold may be used in various ways. For illustration purposes, there are five connections, namely a first, second, third, fourth and fifth connection. The fifth connection has the highest latency and the first connection has the lowest latency. If the difference between the highest latency, i.e the fifth connection's latency, and the lowest latency, i.e. the first connection's latency, is more than the latency discrepancy threshold, the fifth connection is no longer used for transmitting data packets and may be terminated. In another illustration, if the difference between the fifth connection's latency and the average latency of the first, second, third and fourth connections is higher than the latency discrepancy threshold, the fifth connection is no longer used for transmitting data packets and may be terminated. In another illustration, when the latency of each of the first, second, third, and fourth connections is around 500 milliseconds, the latency of the fifth connection is around 1000 milliseconds, and the latency discrepancy threshold is 400 milliseconds, the fifth connection is not used for transmitting data packets and may be terminated. In one illustration, the average, variance, and standard deviation of latencies of the first, second, third, fourth and fifth connections is calculated. The latency discrepancy threshold is set to be the standard deviation of the latencies. If the difference between latencies of the connections is higher than the standard deviation, one or more connections with comparatively high latency is no longer used for transmitting data and may be terminated.

For illustration purpose, when there are one or more connection established through an LTE network or Ethernet interface, processing unit 201 does not connect to a 3G network even when it is capable of doing so through one or more of network interfaces 205. It should be known to those skilled in the art that the latency of connections established through a 3G network may be significantly higher than that of connections established through LTE network or Ethernet interface.

The embodiments were chosen and described in order to best explain the principles of the invention and its practical applications, to thereby enable others skilled in the art to best utilize the invention and various embodiments with various modifications as are suited to the particular use contemplated. The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage medium. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. A code segment may represent a procedure, a function, a subprogram, a program, a routine, a subroutine, a module, a software package, a class, or any combination of instructions, data structures, or program statements. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

An access connection may carry one or more protocol data, including but not limited to Transmission Control Protocol (TCP), User Datagram Protocol (UDP), Internet Control Message Protocol (ICMP), Hypertext Transfer Protocol (HTTP), Post Office Protocol (POP3), File Transfer Protocol (FTP), and Internet Message Access Protocol (IMAP). An access connection may be a wired network or a wireless network. A wired access connection may be implemented using Ethernet, fiber optic, cable, DSL, frame relay, token ring, serial bus, USB, Firewire, PCI, T1, or any material that can pass information. A wireless access connection may be implemented using infra-red, High-Speed Packet Access (HSPA), HSPA+, Third Generation of mobile telecommunications technology (3G), Fourth Generation of mobile telecommunications technology (4G), Long Term Evolution (LTE), WiMax, ATM, GPRS, EDGE, GSM, CDMA, WiFi, CDMA2000, WCDMA, TD-SCDMA, BLUETOOTH, WiBRO or any other wireless technologies.

A logical connection can be made at either Layer 2 or Layer 3 of the (Open Systems Interconnection) OSI model that connects two endpoints over a public, private or hybrid public and private network to form a connection. Virtual private network (VPN) is one example of logical connection models. A VPN can be a Layer 2 VPN or Layer 3 VPN. A logical connection can also be established using connection oriented communication protocol, such as transmission control protocol (TCP). A logical connection may be referred as an end-to-end connection as it forms a connection between two endpoints.

Figure 10:
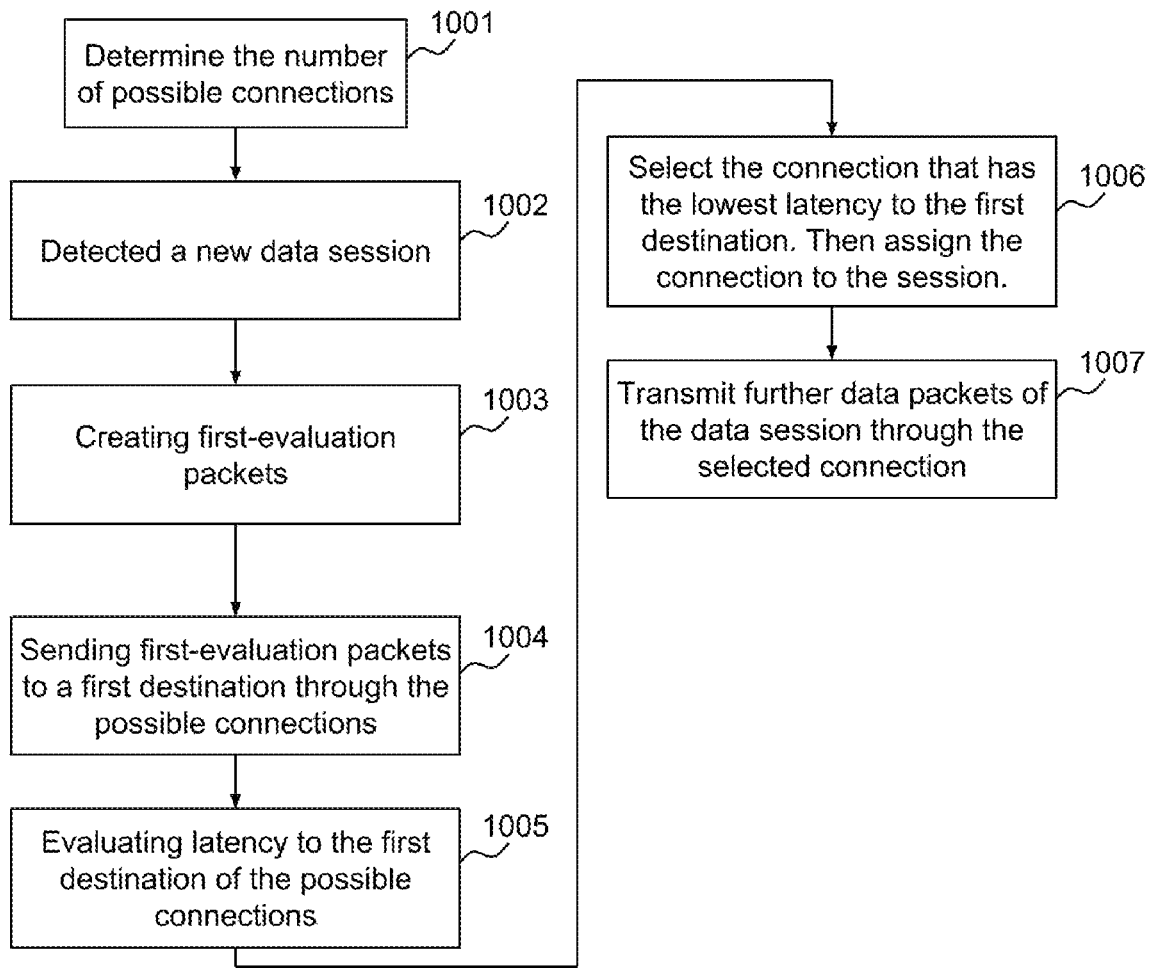
FIG. 10 is a flowchart illustrating a process according to one of the embodiments of the present invention.

FIG. 10 includes a flowchart illustrating a process according to some embodiments for transmission of data packets by a communications device, such as communications device 106, communications device 108, a router, a computer and an Internet of Things (IoT) device. The flowchart can represent a routine or program instructions stored in a memory device, such as the main memory 202 and/or secondary storage 204, or another storage device (not shown) within the communications device. Processing unit 201 can be configured to execute the routine or program instructions.

The process is to use first-evaluation data packets to determine the connection that satisfies the criteria for selecting a connection. For readability, the criteria for selecting a connection is referred to as connection selection criteria (CSC). One of the examples of CSC is lowest latency connection. The connection that satisfies CSC will used for sending out data packets. The connection selected according to CSC is referred to as selected connection (SC). A connection may be a WAN network interface, an access connection, a logical connection, an end-to-end connection, or an aggregated end-to-end connection to transmit data packets.

For readability, communications device 106 is used for describing the flowchart. There is no limitation that only communications device 106 can be used for the process. At step 1001, communications device 106 determines the number of connections that it can transmit data packets. At step 1002, communications device 106 detected a new data session destined for hosts or devices in network 110. One technique to detect new data session is to examine session identification in data packets received. For example, a unique session identification is a session identifier stored in the header of an IP packet. In another example, the session identifier is stored in the payload of an IP packet. In another example, TCP data packets do not include a session identifier, a session is identified by using the sender's address, sender's port number, destination's address and destination's port. In another example, deep packet inspection (DPI) is performed in order to identify data sessions. The signature database for performing DPI may be provided by the manufacturer of communications device 106, provided by the administrator of communications devices 106, received from a computing device located in the LAN area of communications device 106, or received from a remote server.

The session identifier becomes one of match conditions (MC) for the communications device 106. There is no limitation that only a session identifier can be a MC. For example, in the case of DPI is used, a selected signature may be one of the MCs.

Figure 13:
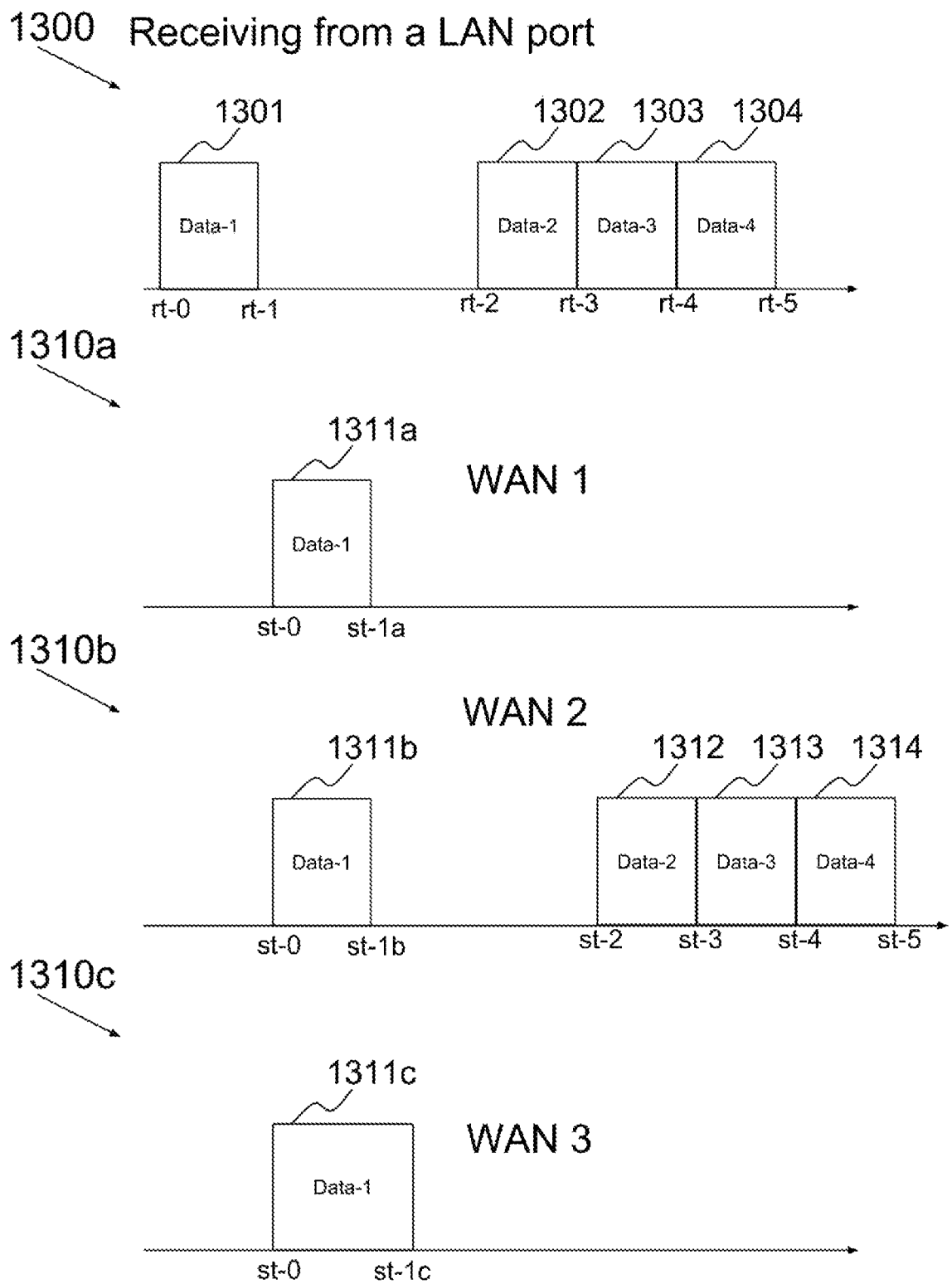
FIG. 13 illustrates timing graphs representing transmission of data packets according to one of the embodiments of the present invention.

Viewing FIG. 13 in conjunction with FIG. 10, data packet 1301 is the first data packet of a data session received from a sending device connecting to LAN interface of communications device 106. Data packet 1301 may also be the first data packet of a data session generated by communications device 106. Data packet 1301 holds information data-1 in its payload. At time rt-0 data packet 1301 is being received or generated and at time rt-1 data packet 1301 is completely received or generated by communications device 106. Communications device 106 performs as a gateway for the sending device and may form other networking functions, such as network address translation (NAT) and routing.

At step 1003, one or more first-evaluation packets are created. The number of first-evaluation packets created is based on the number of possible connections determined in step 1001. For example, if there are five possible connections, five first-evaluation packets are created. In one variant, the number of first-evaluation packets is smaller than the number of possible connections as not all possible connections will be used to send the first-evaluation packets in step 1004.

As communications device 106 is performing as the gateway for the sending device, payload of the first data packet of the data session detected at step 1002 will then be copied to the payload of the first-evaluation packets. Destination address and destination port number of the first-evaluation packets will also be the same as of the first data packet. For illustration purpose, there are three possible connections. Therefore, three first-evaluation packets 1311a-1311c are created. First-evaluation packets 1311a-1311c hold the same information data-1 in their respective payloads.

At step 1004, first-evaluation packets 1311a-1311c are transmitted through corresponding connections. For example, first-evaluation packet 1311a-1311c are transmitted through first connection, second connection and third connection respectively. Time st-0 is the time starting to transmit first-evaluation packets 1311a-1311c. For illustration purpose, at time st-1a, st-1b and st-1c, first-evaluation packets 1311a, 1311b and 1311c are completely transmitted through the first connection, second connection and third connection respectively. Also, for illustration purpose time st-1a, st-1b and st-1c are 100 milliseconds, 100 milliseconds and 150 milliseconds respectively.

At step 1005, latency of the connections, for example, the first connection, second connection and third connection, are determined. One of the techniques to evaluate latency is to measure the respective arrival time of acknowledgement packets. For example, communications device 106 receives an acknowledgment for first-evaluation packet 1311a at about 500 milliseconds after st-a1, an acknowledgment for first-evaluation packet 1311b at about 10 milliseconds after time st-1b, and no acknowledgement for first-evaluation packet 1311c. Among all acknowledgements, the acknowledgement to first-evaluation packet 1311b is the first received by communications device 106, therefore, processing unit of communications device 106 determines that connection 1310b has the lowest latency.

An acknowledgement may be comprised of one or more data packets. When there a plurality of acknowledgements corresponding to the first-evaluation packets received by communications device 106, only one acknowledgment will be forwarded to the sending device. The other acknowledgments will be discarded. One of the reasons to discard the other acknowledgment is that: the device or an application running in the sending device that generates the first data packet of the data session, in general, does not expect multiple acknowledgments. If a plurality of acknowledgements are forwarded to the sending device, the sending device or the application may be confused or may be result in error.

As connection 1310b has the lowest latency, processing unit of communications device 106 selects connection 1310b in step 1006 to be the SC and transmit contents, such as data-2, data-3 and data-4, of further data packets, such as data packets 1032, 1303 and 1304, of the data session through connection 1310b in step 1007. Therefore data packets 1312-1314, holding data-2, data-3, and data-4 respectively, will be transmitted through connection 1310b.

In one more detailed example, the data session is a secured data session. It is common that in order to establish a secured connection between a sending device connected to the LAN interface of communications device 106 or communications device 106 itself and a receiving device at the other end of the to be secured connection, the first data packet or the first few data packets do not hold authentication information. Therefore, by using the first data packet to create a plurality of first-evaluation packets, receiving device, in general, should not be confused by the first-evaluation packets. It is possible that more computing and networking resources at the receiving device may be consumed when receiving the plurality of first-evaluation packet comparing to only receiving one first-evaluation packet.

In one variant, the first-evaluation packets are not created based on information held in the first data packet of the data session. Instead, the first-evaluation packets hold predefined information or randomly created data. Once a connection is selected in step 1006 to be the SC for the data session, the first data packet and further data packets of the data session will then be transmitted through the SC.

In one variant, CSC is selected at step 1006 is substantially based on bandwidth availability of each of the possible connections. Steps 1003 to 1005 will also be changed to detect bandwidth availability. Those who are skilled in the arts would appreciate that there are myriad ways to evaluate bandwidth availability in a connection, such as using results from Speedtest.net by Ookla. In one variant, the bandwidth availability is measured between the communications device 106 to the first destination. Those who are skilled in the arts would appreciate that there are myriad ways to evaluate bandwidth availability between communications device 106 and the first destination, such as using Bing, which is a point-to-point bandwidth measurement tool in Linux.

There is no limitation that only latency and bandwidth availability are the only CSC. The CSC may be one or a combination of latency, bandwidth availability, number of sessions, number of hops, other network performance information, tariffs, time, and geographical information.

There is no limitation that processing unit of communications device 106 will perform steps 1001 to 1007 on all data packets and/or all data sessions originated from its LAN. In one example, step 1002 is performed only a new data session is detected and the data session satisfies a MC. Other MC examples include: data packets are originated from a specific IP address. In another example; destination port number of data packets is a specific port number; and DPI results.

Figure 11:
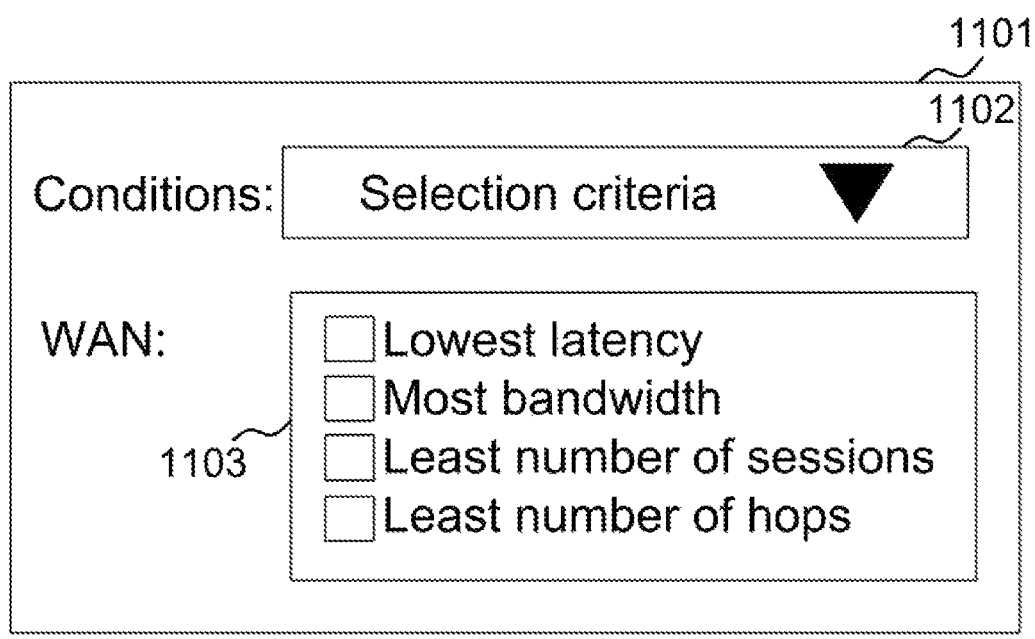
FIG. 11 illustrates a graphical user interface (GUI) for a user or an administrator of communications device according to one of the embodiments of the present invention.

FIG. 11 illustrates a graphical user interface (GUI) 1101 for a user or an administrator of communications device 106 to select one or more data sessions for using a SC in step 1006.

Dropdown box 1102 allows the user or the administrator to create a MC or to select a MC. Box 1103 allows the user or the administrator to select a CSC. For example, an address of a particular computing device is the MC in dropdown box 1102 and the CSC is to use a WAN which has the most bandwidth to transmit data packets from the particular computing device. In another example, data packets, which from a gaming laptop and designated for one or more network nodes with a particular domain name identity, will be transmitted through the WAN which has the lowest latency. Therefore, the MC is a combination of source address of the gaming laptop and the domain name entered in dropdown box 1102. As lowest latency checkbox is checked in box 1103, the CSC becomes the connection with the lowest latency.

In one variant, communication devices 106 retrieves the one or more MCs from one or more remote servers. The MCs are the presented with a name convention that are related to applications. For example, "Game Hero" is assigned as the name of a MC and is used to indicate a MC for data packets related to Game Hero. Data packets related to Game Hero will then be sent to a connection selected, which has least jitter among all connections. Signatures of data sessions related to destination of remote hosts of Game Hero will be used to identify the data sessions by communications device 106. For example, there are five servers that the Game Hero uses. The port numbers and destination addresses of these five servers will be used by communications device 106 as the MC.

In one variant, GUI 1101 is similar to setting outbound rules at a firewall. Dropdown box 1102 may be any input fields that allows the user or the administrator to enter MC. Box 1103, unlike actions in outbound rules, is to enter CSC.

Figure 12:
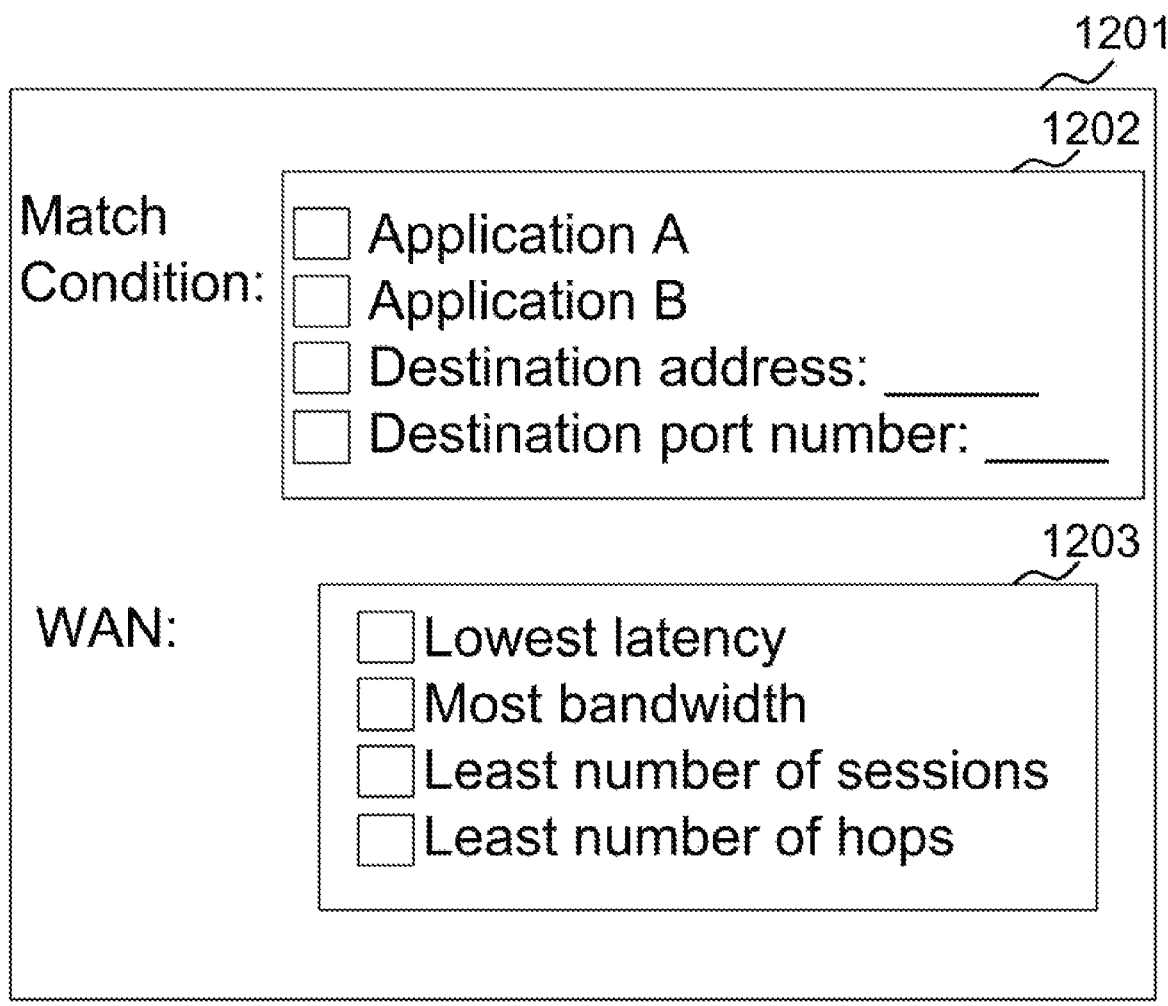
FIG. 12 illustrates a GUI for a user to select parameters according to one of the embodiments of the present invention.

FIG. 12 illustrates a GUI 1201 for a user to select a MC at box 1202 and to select a WAN in box 1203 for the particular type of data packets that matches the MC selected in box 1202. GUI 1201 is produced by a software running inside a computing device, such as a computer, a mobile phone or an IoT device. The computing device may also be the sending device. For readability, the software is referred as connection selection software (CSS) herein. In one example, a user requires a MC to be Application B in the computing device and to lowest latency as the CSC for selecting a WAN of communications device 106. As a result, checkboxes next to "Application B" in dropdown box 1202 and "Lowest latency" in 1203 are checked respectively. All data packets created by Application B will satisfy the MC. The CSC is sent from CSS to communications device 106.

In another example, when the third checkbox is checked in box 1202 with a destination address entered, and the fourth checkbox is checked in box 1202 with a destination port number entered, the MC is set to be a combination of the destination address and destination port number. Data packets matching the MC will be sent through the WAN selected according to the CSC set in box 1203.

In one particular detailed example, application names in box 1202, such as Application A and Application B, are entered by the user or the administrator of the computing device. Alternatively, the application names are detected by CSS.

In one variant, there is no box 1203 and only applications can be selected in box 1202. Therefore a user only selects applications. Applications selected will then be transmitted through connection selected by default. In one example, the connection selected by default is a WAN with the lowest latency at communications device 106. There is no limitation that the connection selected by default must be the connection with the lowest latency. For example, developer of the CSS can set the connection selected by default must be the connection with the fewest number of hops to a destination.

Figure 14:
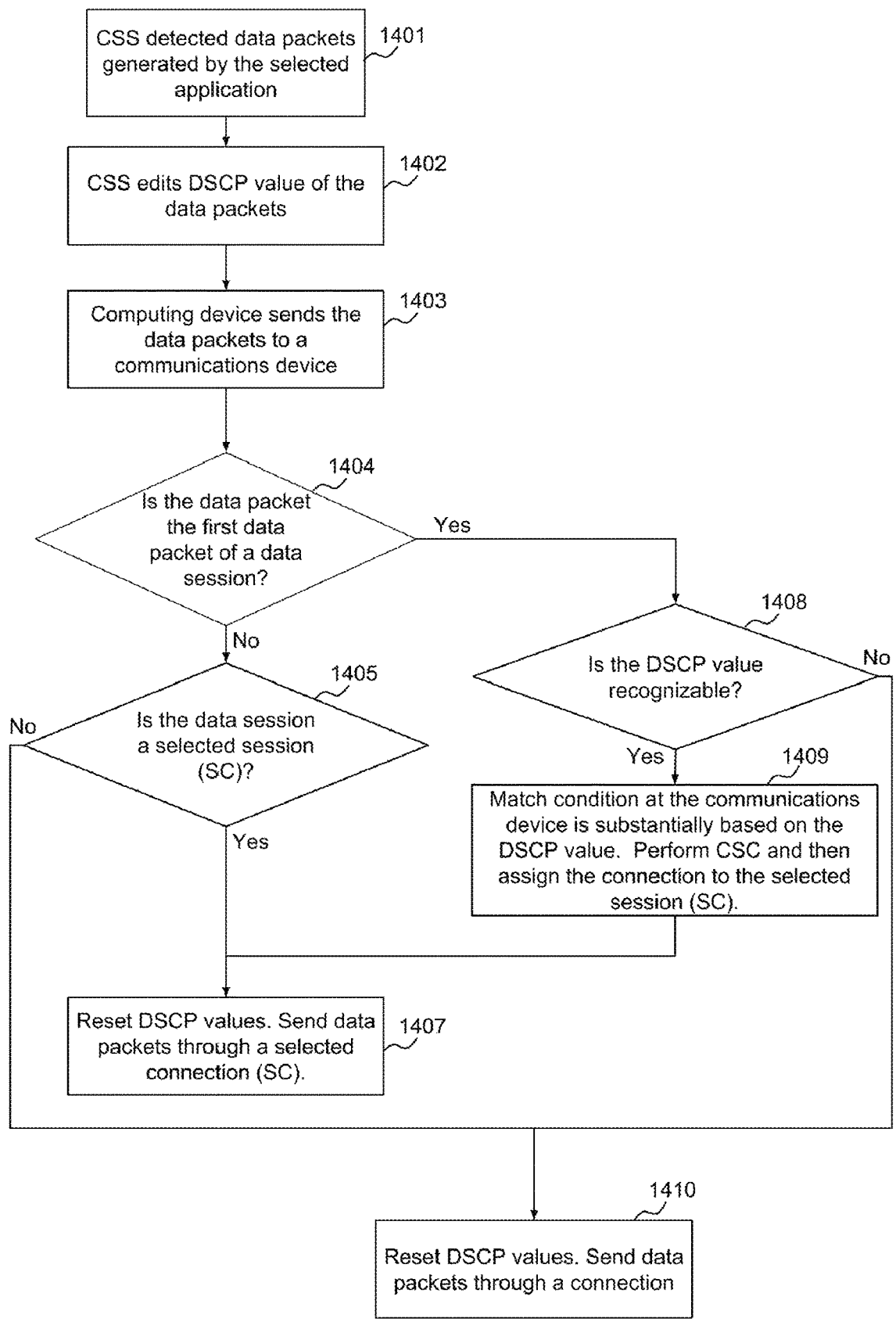
FIG. 14 is a flowchart illustrating a process according to one of the embodiments of the present invention.

FIG. 14 is a flowchart illustrating process according to some embodiments for processing and transmission of data packets. A CSS is running in a computing device, such as a gaming laptop and video camera embedded with a temperature sensor. In one example, for illustration purpose, the computing device is a gaming laptop and running a racing game and other applications, and is connected to a LAN interface of communications device 106. Communications device 106 may not be connected to the computing device directly but is performing as a gateway for the computing device. The computing device is also a sending device. Through a graphical interface, such as GUI 1201, or command line instruction, a user creates a MC. The MC, for example, is based on Application A, which is the racing game. From then on, CSS will process data packets generated by the racing game.

At step 1401, CSS detected data packets generated by the racing game, which is the selected application. CSS intercepts the data packets before the data packets are being transmitted. Then at step 1402 CSS edits or changes Differentiated Services Code Point (DSCP) value in the data packets to a value that communications device 106 is able to recognize. The value may be value as long as it is in compliance with request for comments (RFC) issued by Internet Engineering Task Force (IETF). For example, the DSCP value may be set to 0x11. Then CSS forwards the data packets to the gateway, which is communications device 106.

Destinations of the data packets generated by the racing game may have the same or different destinations. The data packets may also belong to the same or different sessions. Protocol of the data packets may also be the same or different. In one variant, CSS does not edit or change DSCP value in all data packets generated by the selected application. Instead, CSS only edits or changes DSCP value in certain types of data packets generated by the selected application. The user may configure CSS about the types of data packets. CSS may also select the types of data packets according to predefined rules. The predefined rules may be entered by the user, retrieved from a remote server or created by the developer of CSS.

In one variant, CSS only changes or edits DSCP value of the first data packet of a data session generated by the selected application as communications device 106 may only perform MC on the first data packet to select a connection. Communications device 106 may not use DSCP value of other data packets of the data session for MC.

In one variant, steps 1401 and 1402 are performed by the operating system of the computing device. In one example, CSS configures the operation system with a MC by providing the operation system with one of or a combination of application name, destination address, port number and Uniform Resource Identifier (URI). Therefore the operation system is able to edit the DSCP value. In one more detailed example, for Windows 8 operating system, the command to create a QoS policy named Backup, that matches traffic sent to 10.1.1.176/28 subnet and to tag it with DSCP value of 40 and only be effective on traffic sent on a domain-joined network adapter is: New-NetQosPolicy—Name "Backup"—IPDstPrefixMatchCondition 10.1.1.176/28—NetworkProfile Domain—DSCPAction 40.

In one detailed example, only the first data packet of the data session, which satisfies a MC, will have its DSCP value changed or edited by CSS or the operation system. As the DSCP value is used for communication device 106 to recognize the data session, communications device 106 may then store the signature of the data session, such as by using a combination of destination address, destination port, source address and source port number. Further data packets of the data session may not need to have their DSCP value changed or edited by CSS or the operation system. Communications device 106 may still recognize the data session by the combination of destination address, destination port, source address and source port number of the data packets. Alternatively, some or all data packets of the data session will have their DSCP value changed or edited by CSS or the operation system, in addition to the first data packet. Communications device 106 may recognize the data session by the signature of the data session or by the DSCP value.

At step 1403, the gaming laptop sends the data packets to the communications device 106. At step 1404, the processing unit of communications device 1404 will check if the data packets belong to a new session. When computing devices sends a plurality of data packets at step 1403, the processing unit will check the first data packet of the plurality of data packets.

If none of the data packets is the first data packet of a data session, a connection should be already assigned with the session. If the connection assigned with the session is a SC, the SC will be used to transmitted the data packets after DSCP values are reset at step 1407. If the connection assigned with the session is not a SC, the data packets should then be sent through the connection that already assigned with the session at step 1410 after DSCP values of the data packets are reset. One of the benefits for resetting the DSCP values is not to confuse the router in the next hop as the DSCP values may not be understood by the router in the next hop.

In one variant, if the connection assigned with the session is not a SC, the data packets may be then sent through any of the connections.

If the data packet is the first data packet of a data session, at step 1408, the processing unit will determine whether DSCP value of the first data packet is recognizable. If the DSCP value matches one of the value that the processing unit recognize, step 1409 will be performed. Otherwise, step 1410 will be performed. In one example, the DSCP values that can be recognized are 0x11, 0x22 and 0x33. At step 1409, match condition at communications device 106 is based on the DSCP value 0x11, 0x22 and 0x33. When the first data packet matches match condition DSCP value 0x11, CSC is lowest latency connection among all the possible connections. When the first data packet matches MC DSCP value 0x22, CSC is the largest amount of bandwidth among all the possible connections. When the first data packet matches MC DSCP value 0x33, the CSC is the largest signal-to-noise ratio (SNR) among all the possible connections connections. There is no limitation to the DSCP value. There is also no limitation to the CSC. The connection, which is selected according to the CSC is then assigned to the data session, is the SC for data session. Those who are skilled in the arts will appreciate that iptable is one of the tools that can assign a connection with the data session. Step 1407 is then performed.

In one variant, at step 1408, DPI result is used instead of checking the DSCP value, and MC in step 1409 is based on DPI result. This allows administrator of communications device 106 to determine solely on CSC. In one variant, at step 1408, DPI results and DSCP value are checked, and MC in step 1409 is based on the combination of DPI result and DSCP value. This allows administrator of communications device 106 and user of the computing device to jointly configure the MC.

Instead, the processing unit performs DPI to determine whether the data session should be a selected session or not.

In one variant, if there is no connection assigned for the data session, or the DSCP value is not recognized in step 1408, processing unit of communications device 106 may not use the same connection to transmit all the data packets of the data session. Data packets of the data sessions may be transmitted through different connections.

There is no limitation that only DSCP field can be used by CSS to allow communications device 106 to recognize the data packets. Other fields, such as option field, in the data packets can be used. In order not to affect routing and/or forwarding of the data packets by other network nodes, communications device 106 should reset the fields used by CSS to default values.

In one variant, a sending device is capable of sending data packets through a plurality of connections. For example, the gaming laptop is the sending device. The gaming laptop has a plurality of network interfaces and is able to use a plurality of Internet connections. The gaming laptop is also capable of performing functions of communications device 106. Therefore, the gaming laptop is able to perform all the processes described in the flowchart of FIG. 12. For example, instructions executed by the processing unit of the gaming laptop is able to determine whether a data packet satisfies a MC, perform selection according to CSC and transmit the data packets through a selected connection. In one variant, as the same device is generating data packets and perform connection selection, there is no need for another device to recognize data packets that satisfying the MC, and therefore no need to edit or change DSCP value of the data packets.

The invention claimed is:

1. A method for selecting and transmitting data packets through a selected connection of a plurality of possible connections, comprising:
   a. receiving a match condition through a user interface at a computing device;
   b. when a data packet is a first data packet of a data session which satisfies the match condition:
      i. setting differentiated services code point (DSCP) value of the first data packet to a predefined value at the computing device;
      ii. transmitting the first data packet of the data session by a first network node through the selected connection;
   c. when the data packet is not the first data packet, and belongs to the same data session of the first data packet:
      i. resetting the DSCP value;
      ii. transmitting the data packet of the data session by the first network node through the selected connection;
   d. when the data packet does not satisfy the match condition in step (b), or the data packet does not belong to the same data session of the first data packet in step (c), transmitting the data packet of the data session by the first network node through one of the plurality of possible connections;

wherein the selected connection is selected substantially based on a connection selection criteria;

wherein the data packet is generated by the computing device; and wherein the selected connection is one of the plurality of possible connections.

2. The method of claim 1, wherein the data packet is an evaluation packet.

3. The method of claim 1, wherein the connection selection criteria is received by the first network node.

4. The method of claim 1, wherein the connection selection criteria is one or a combination of latency, bandwidth availability, number of sessions, number of hops, other network performance information, tariffs, time, and geographical information.

5. The method of claim 4, wherein the latency is evaluated using first-evaluation packets, and wherein the first-evaluation packets hold contents based on the first data packet.

6. The method of claim 1, wherein the user interface is a graphical user interface.

7. The method of claim 1, wherein the match condition is substantially based on data packets from a first application, and
wherein the match condition is retrieved from a remote server to the first network node.

8. The method of claim 7, wherein the first application is performed at the computing device.

9. The method of claim 1, wherein the computing device and the first network node are one electronic device.

10. The method of claim 1, wherein the DSCP value is recognizable by the first network node and the DSCP value is reset by the first network node.

11. A system comprising a computing device and a first network node, wherein the computing device comprises:
at least one first network interface;
at least one first processing unit;
at least one first main memory;
at least one first user interface;
at least one first non-transitory computer readable medium storing program instructions executable by the at least one first processing unit for:
a. receiving a match condition through the at least one first user interface;
b. when a data packet is a first data packet of a data session which satisfies the match condition, setting differentiated services code point (DSCP) value of the first data packet to a predefined value;
and the first network node comprises:
at least one second network interface;
at least one second processing unit;
at least one second main memory;
at least one second non-transitory computer readable medium storing program instructions executable by the at least one second processing unit:
c. when the data packet is the first data packet of a data session which satisfies the match condition, transmitting the first data packet of the data session through a selected connection; wherein the selected connection is one of possible connections;
d. when the data packet is not the first data packet, and belongs to same data session of the first data packet:
   i. resetting the DSCP value;
   ii. transmitting the data packet of the data session by the first network node through the selected connection;
e. when the data packet does not satisfy the match condition in step (b), or the data packet does not belong to the same data session of the first data packet in step (c), transmitting the data packet of the data session by the first network node through one of the plurality of possible connections;
wherein the selected connection is selected substantially based on a connection selection criteria.

12. The system of claim 11, wherein the data packet is an evaluation packet.

13. The system of claim 12, wherein the connection selection criteria is received by the first network node.

14. The system of claim 11, wherein the connection selection criteria is one or a combination of latency, bandwidth availability, number of sessions, number of hops, and other network performance information, tariffs, time, and geographical information.

15. The system of claim 14, wherein the latency is evaluated using first-evaluation packets, and wherein the first-evaluation packets hold contents based on the first data packet.

16. The system of claim 11, wherein the at least one first user interface is a graphical user interface.

17. The system of claim 11, wherein the match condition is substantially based on data packets from a first application, and wherein the match condition is retrieved from a remote server to the first network node.

18. The system of claim 17, wherein the first application is being performed at the computing device.

19. The system of claim 11, wherein the computing device and the first network node are one electronic device.

20. The system of claim 11, wherein the DSCP value is recognizable by the first network node and the DSCP value is reset by the first network node.

* * * * *